US011044040B2

(12) United States Patent
Yoshimoto et al.

(10) Patent No.: US 11,044,040 B2
(45) Date of Patent: Jun. 22, 2021

(54) BASE STATION APPARATUS, TERMINAL APPARATUS, AND COMMUNICATION METHOD FOR THE SAME

(71) Applicants: SHARP KABUSHIKI KAISHA, Sakai (JP); FG INNOVATION COMPANY LIMITED, Tuen Mun (HK)

(72) Inventors: Takashi Yoshimoto, Sakai (JP); Osamu Nakamura, Sakai (JP); Jungo Goto, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 48 days.

(21) Appl. No.: 16/619,872

(22) PCT Filed: Jun. 8, 2018

(86) PCT No.: PCT/JP2018/022001
§ 371 (c)(1),
(2) Date: Dec. 5, 2019

(87) PCT Pub. No.: WO2018/230458
PCT Pub. Date: Dec. 20, 2018

(65) Prior Publication Data

US 2020/0106550 A1 Apr. 2, 2020

(30) Foreign Application Priority Data

Jun. 12, 2017 (JP) ............................. JP2017-115010

(51) Int. Cl.
*H04L 1/00* (2006.01)
*H04W 76/11* (2018.01)
(Continued)

(52) U.S. Cl.
CPC .......... *H04L 1/0026* (2013.01); *H04L 1/0004* (2013.01); *H04W 72/042* (2013.01);
(Continued)

(58) Field of Classification Search
CPC .... H04L 1/0026; H04L 1/0004; H04W 76/11; H04W 76/27; H04W 72/042; H04W 72/0446
(Continued)

(56) References Cited

U.S. PATENT DOCUMENTS

2020/0204289 A1* 6/2020 Yoshimoto .......... H04W 72/042
2020/0213901 A1* 7/2020 Yoshimoto .............. H04L 27/26
2020/0323031 A1* 10/2020 Nakamura ........... H04B 17/309

OTHER PUBLICATIONS

"3rd Generation Partnership Project; Technical Specification Group Radio Access Network; Evolved Universal Terrestrial Radio Access (E-UTRA); Physical layer procedures(Release 8)", 3GPP TS 36.213 v8.8.0 (Sep. 2009).

(Continued)

*Primary Examiner* — Peter G Solinsky
(74) *Attorney, Agent, or Firm* — ScienBiziP, P.C.

(57) ABSTRACT

In a case that a CQI table applied to interpret a CSI report is changed from a first CQI table including modulation schemes up to 64QAM to a second CQI table including modulation schemes up to 256QAM, information on a CQI table selection indicating applicability of the second CQI table and a CSI subframe set indicating subframes for which a CQI table selected in the CQI table is used are transmitted. In a case that the CQI table applied to interpret the CSI report is changed from the second CQI table to a third CQI table including modulation schemes up to 1024QAM, only the information on the CQI table selection indicating applicability of the third CQI table is transmitted.

4 Claims, 19 Drawing Sheets

(51) Int. Cl.
*H04W 76/27* (2018.01)
*H04W 72/04* (2009.01)

(52) U.S. Cl.
CPC ........ *H04W 72/0446* (2013.01); *H04W 76/11* (2018.02); *H04W 76/27* (2018.02)

(58) Field of Classification Search
USPC .......................................................... 370/329
See application file for complete search history.

(56) References Cited

OTHER PUBLICATIONS

"3rd Generation Partnership Project; Technical Specification Group Radio Access Network; Evolved Universal Terrestrial Radio Access (E-UTRA); Physical layer procedures(Release 12)", 3GPP TS 36.213 v12.5.0 (Mar. 2015).

* cited by examiner

| CQI INDEX | MODULATION SCHEME | CODING RATE × 1024 | FREQUENCY UTILIZATION EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 2

| CQI INDEX | MODULATION SCHEME | CODING RATE × 1024 | FREQUENCY UTILIZATION EFFICIENCY |
|---|---|---|---|
| 0 | OUT OF RANGE | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 3

| CQI INDEX | MODULATION SCHEME | CODING RATE × 1024 | FREQUENCY UTILIZATION EFFICIENCY |
|---|---|---|---|
| 0 | OUT OF RANGE | | |
| 1 | QPSK | 449 | 0.8770 |
| 2 | 16QAM | 378 | 1.4766 |
| 3 | 16QAM | 490 | 1.9141 |
| 4 | 16QAM | 616 | 2.4063 |
| 5 | 64QAM | 466 | 2.7305 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 256QAM | 948 | 7.4063 |
| 14 | 1024QAM | 817 | 7.9837 |
| 15 | 1024QAM | 928 | 9.0646 |

FIG. 4

| MCS INDEX | MODULATION ORDER | TBS INDEX |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |

| MCS INDEX | MODULATION ORDER | TBS INDEX |
|---|---|---|
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 5

| MCS INDEX | MODULATION ORDER | TBS INDEX |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |
| 31 | 8 | |

FIG. 6

| MCS INDEX | MODULATION ORDER | TBS INDEX |
|---|---|---|
| 0 | 2 | 6 |
| 1 | 2 | 8 |
| 2 | 4 | 10 |
| 3 | 4 | 11 |
| 4 | 4 | 12 |
| 5 | 4 | 13 |
| 6 | 4 | 14 |
| 7 | 4 | 15 |
| 8 | 6 | 16 |
| 9 | 6 | 17 |
| 10 | 6 | 18 |
| 11 | 6 | 19 |
| 12 | 6 | 20 |
| 13 | 6 | 21 |
| 14 | 6 | 22 |
| 15 | 6 | 23 |

| MCS INDEX | MODULATION ORDER | TBS INDEX |
|---|---|---|
| 16 | 6 | 24 |
| 17 | 6 | 25 |
| 18 | 8 | 27 |
| 19 | 8 | 28 |
| 20 | 8 | 29 |
| 21 | 8 | 30 |
| 22 | 8 | 31 |
| 23 | 8 | 32 |
| 24 | 8 | 33 |
| 25 | 10 | 34 |
| 26 | 10 | 35 |
| 27 | 2 | reserved |
| 28 | 4 | |
| 29 | 6 | |
| 30 | 8 | |
| 31 | 10 | |

FIG. 7

BASE STATION APPARATUS, TERMINAL APPARATUS, AND COMMUNICATION METHOD FOR THE SAME

TECHNICAL FIELD

The present invention relates to a base station apparatus, a terminal apparatus, and a communication method for the same.

This application claims priority based on JP 2017-115010 filed on Jun. 12, 2017, the contents of which are incorporated herein by reference.

BACKGROUND ART

A modulation scheme with a maximum of 64 quadrature amplitude modulation (QAM) has been introduced to a Long Term Evolution (LTE) communication system whose specifications have been created in a Third Generation Partnership Project (3GPP) (NPL 1). A terminal apparatus notifies a base station apparatus of a Channel Quality Indicator (CQI) to notify a downlink channel condition. The CQI is a modulation scheme that satisfies a predetermined error rate from a Channel Quality Indicator (CQI) table including QPSK, 16QAM, and 64QAM. The base station apparatus selects one modulation scheme used for downlink data transmission from a Modulation and Coding Scheme (MCS) table including the QPSK, 16QAM, and 64QAM based on the CQI. A 256QAM modulation scheme has been further introduced to an LTE-Advanced (LTE-A) communication system to satisfy a demand for high-speed transmission (NPL 2). In a case that a terminal apparatus supporting the 256QAM performs data transmission using the 256QAM, the terminal apparatus notifies the base station apparatus of a modulation scheme satisfying a predetermined error rate from another CQI table including the QPSK, 16QAM, 64QAM, and 256QAM as the CQI. In the case that the terminal apparatus supporting the 256QAM performs the data transmission using the 256QAM, the terminal apparatus selects one modulation scheme used for downlink data transmission from another MCS table including the QPSK, 16QAM, 64QAM, and 256QAM.

CITATION LIST

Non Patent Literature

NPL 1: "3rd Generation Partnership Project; Technical Specification Group Radio Access Network; Evolved Universal Terrestrial Radio Access (E-UTRA); Physical layer procedures (Release 8)" 3GPP TS 36.213 v8.8.0 (2009-09)

NPL 2: "3rd Generation Partnership Project; Technical Specification Group Radio Access Network; Evolved Universal Terrestrial Radio Access (E-UTRA); Physical layer procedures (Release 12)" 3GPP TS 36.213 v12.5.0 (2015-03)

SUMMARY OF INVENTION

Technical Problem

Data wireless transmission at a higher speed will be required in the future to address applications requiring large volume communications, such as video streaming, video conference, games, and tethering. An aspect of the present invention has been made in view of such circumstances, and an object of the present invention is to provide a base station apparatus, a terminal apparatus, and a communication method that allow flexibly selecting a modulation scheme according to a channel condition using multiple CQI tables and MCS tables to achieve such high speed data transmission.

Solution to Problem

To address the above-mentioned drawbacks, a base station apparatus, a terminal apparatus, and a communication method according to an aspect of the present invention are configured as follows.

(1) An aspect of the present invention is a base station apparatus that communicates with a terminal apparatus, the base station apparatus including a transmitter configured to transmit CSI report configuration information, a receiver configured to receive a CSI report, and a controller configured to interpret the CSI report based on the CSI report configuration information, wherein the transmitter is further configured to, in a case that a CQI table applied to interpret the CSI report is changed from a first CQI table to a second CQI table, transmit information on a CQI table selection indicating applicability of the second CQI table, and a CSI subframe set indicating subframes for which a CQI table configured with the information on the CQI table selection is used, the transmitter is further configured to, in a case that the CQI table applied to interpret the CSI report is changed from the second CQI table to a third CQI table, transmit the information on the CQI table selection indicating applicability of the third CQI table, the first CQI table includes at least a first modulation scheme, the first modulation scheme includes QPSK, 16QAM, and 64QAM, the second CQI table includes at least a second modulation scheme, the second modulation scheme includes QPSK, 16QAM, 64QAM, and 256QAM, the third CQI table includes at least a third modulation scheme, and information on the third modulation scheme includes QPSK, 16QAM, 64QAM, 256QAM, and 1024QAM.

(2) In addition, according to an aspect of the present invention, the controller is further configured to apply the CQI table used to interpret the CSI report to determine a modulation scheme to be used to modulate of a PDSCH.

(3) In addition, according to an aspect of the present invention, in a case that the transmitter transmits the CSI report configuration information including only the information on the CQI table selection as information for selecting the CQI table, the controller is further configured to interpret the CSI report by using the information on the CQI table selection and the CSI subframe set indicated by CSI report configuration information transmitted before the CSI report configuration information.

(4) In addition, according to an aspect of the present invention, in a case that the transmitter transmits the CSI report configuration information including only the information on the CQI table selection as information for selecting the CQI table, the controller is further configured to apply the information on the CQI table selection to all the subframes and interpret the CSI report.

(5) In addition, according to an aspect of the present invention, the transmitter is further configured to, in a case that only the subframes used for the CQI table applied to interpret the CSI report are changed, transmit the CSI subframe set, and the controller is further configured to interpret the CSI report by using the CSI subframe set and the information on the CQI table selection indicated by CSI report configuration information transmitted before the CSI subframe set.

(6) In addition, according to an aspect of the present invention, the information on the CQI table selection indicates two CQI tables selected from the first CQI table, the second CQI table, and the third CQI table, and the controller is further configured to: apply one CQI table among the two CQI tables selected to the subframes indicated by the CSI subframe set to interpret the CSI report; and apply another CQI table among the two CQI tables selected to the subframes not indicated by the CSI subframe set to interpret the CSI report.

(7) In addition, according to an aspect of the present invention, the controller is further configured to apply the CQI table used to interpret the CSI report to the subframes indicated by the CSI subframe set to determine a modulation scheme to be used to modulate a PDSCH.

(8) An aspect of the present invention is a communication method for a base station apparatus that communicates with a terminal apparatus, the communication method including: transmitting CSI report configuration information; receiving a CSI report; and performing a control to interpret the CSI report based on the CSI report configuration information; the method further including, wherein in a case that a CQI table applied to interpret the CSI report is changed from a first CQI table to a second CQI table, information on a CQI table selection indicating applicability of the second CQI table and a CSI subframe set indicating subframes for which a CQI table selected with the information on the CQI table selection is used are transmitted; in a case that the CQI table applied to interpret the CSI report is changed from the second CQI table to a third CQI table, the information on the CQI table selection indicating applicability of the third CQI table, the first CQI table includes at least a first modulation scheme, wherein the first modulation scheme includes QPSK, 16QAM, and 64QAM, the second CQI table includes at least a second modulation scheme, the second modulation scheme includes QPSK, 16QAM, 64QAM, and 256QAM. The third CQI table includes at least a third modulation scheme, and information on the third modulation scheme includes QPSK, 16QAM, 64QAM, 256QAM, and 1024QAM.

(9) An aspect of the present invention is a terminal apparatus that communicates with a base station apparatus the terminal apparatus includes a receiver configured to receive CSI report configuration information, a transmitter configured to transmit a CSI report, and a controller configured to create the CSI report based on the CSI report configuration information, wherein the controller is further configured to, in a case that the CSI report configuration information includes information on a CQI table selection indicating a CQI table applied to create the CSI report and a CSI subframe set indicating subframes to which the CQI table is applied, create the CSI report by using the information on the CQI table selection and the CSI subframe set, the controller is further configured to, in a case that the CSI report configuration information includes only the information on the CQI table selection as information for selecting the CQI table, create the CSI report by using the information on the CQI table selection and a CSI subframe set indicated by CSI report configuration information received before the CSI report configuration information, the information on the CQI table selection indicates which of a first CQI table, a second CQI table, and a third CQI table is to be applied to the CSI report configuration information to create the CSI report, the first CQI table includes at least a first modulation scheme, the first modulation scheme includes QPSK, 16QAM, and 64QAM, the second CQI table includes at least a second modulation scheme, the second modulation scheme includes QPSK, 16QAM, 64QAM, and 256QAM, the third CQI table includes at least a third modulation scheme, and information on the third modulation scheme includes QPSK, 16QAM, 64QAM, 256QAM, and 1024QAM.

(10) An aspect of the present invention is a communication method for a terminal apparatus that communicates with a base station apparatus, the communication method including: receiving CSI report configuration information; transmitting a CSI report; and performing a control to create the CSI report based on the CSI report configuration information, wherein in a case that the CSI report configuration information includes information on a CQI table selection indicating a CQI table applied to create the CSI report and a CSI subframe set indicating subframes to which the CQI table is applied, the CSI report is created by using the information on the CQI table selection and the CSI subframe set, in a case that the CSI report configuration information includes only the information on the CQI table selection as information for selecting the CQI table, the CSI report is created by using the information on the CQI table selection and the CSI subframe set indicated by CSI report configuration information received before the CSI report configuration information, the information on the CQI table selection indicates which of a first CQI table, a second CQI table, and a third CQI table is to be applied to the CSI report configuration information to create the CSI report, the first CQI table includes at least a first modulation scheme, the first modulation scheme includes QPSK, 16QAM, and 64QAM, the second CQI table includes at least a second modulation scheme, the second modulation scheme includes QPSK, 16QAM, 64QAM, and 256QAM, the third CQI table includes at least a third modulation scheme, and information on the third modulation scheme includes QPSK, 16QAM, 64QAM, 256QAM, and 1024QAM.

Advantageous Effects of Invention

According to one or more aspects of the present invention, the base station apparatus and the terminal apparatus can flexibly select the modulation scheme according to a channel condition using the multiple CQI tables and MCS tables.

BRIEF DESCRIPTION OF DRAWINGS

FIG. 2 is a diagram illustrating an example of a CQI table according to the first embodiment.

FIG. 3 is a diagram illustrating another example of the CQI table according to the first embodiment.

FIG. 4 is a diagram illustrating yet another example of the CQI table according to the first embodiment.

FIG. 5 is a diagram illustrating an example of an MCS table according to the first embodiment.

FIG. 6 is a diagram illustrating another example of the MCS table according to the first embodiment.

FIG. 7 is a diagram illustrating yet another example of the MCS table according to the first embodiment.

DESCRIPTION OF EMBODIMENTS

A communication system according to the present embodiments includes a base station apparatus (a cell, a small cell, a serving cell, a component carrier, an eNodeB, a Home eNodeB, and a gNodeB) and a terminal apparatus (a terminal, a mobile terminal, and User Equipment (UE)). In the communication system, in case of a downlink, the base station apparatus serves as a transmitting apparatus (a transmission point, a transmit antenna group, a transmit antenna port group, or a TRP (Tx/Rx Point)), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D) communication. In this case, the terminal apparatus serves both as a transmitting apparatus and as a receiving apparatus.

The communication system is not limited to data communication between the terminal apparatus and the base station apparatus, the communication involving human beings, but is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a multi-carrier transmission scheme, such as a Cyclic Prefix-Orthogonal Frequency Division Multiplexing (CP-OFDM). The communication system may use, in the uplink, a transmission scheme, such as a Discrete Fourier Transform Spread-Orthogonal Frequency Division Multiplexing (DFTS-OFDM, also referred to as an SC-FDMA). Although the following describes a case of using an OFDM transmission scheme in the uplink and the downlink, the transmission scheme is not limited to this and another transmission scheme is applicable.

The base station apparatus and the terminal apparatus according to the present embodiments can communicate in a frequency band for which permission has been obtained from the government of a country or area where a radio operator provides service, i.e., a so-called licensed band, and/or in a frequency bands that requires no permission from the government of the country or area, i.e., a so-called unlicensed band.

According to the present embodiments, "X/Y" includes the meaning of "X or Y." According to the present embodiments, "X/Y" includes the meaning of "X and Y." According to the present embodiments, "X/Y" includes the meaning of "X and/or Y."

First Embodiment

Figure 1:
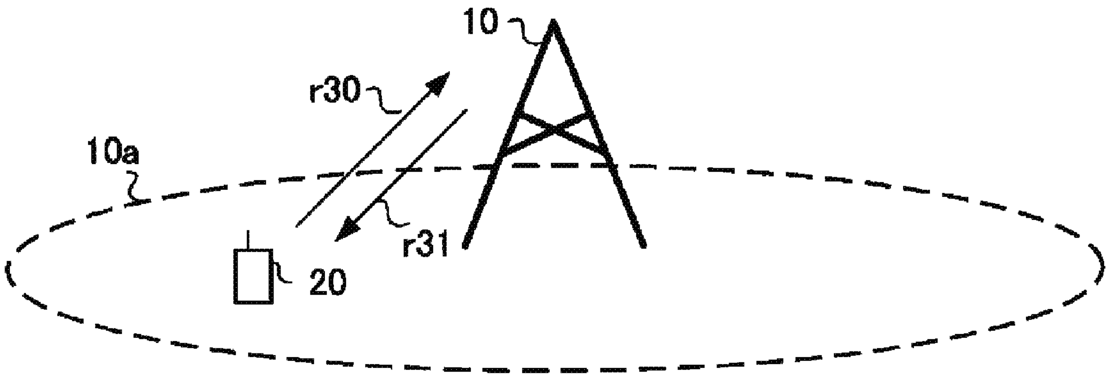
FIG. 1 is a diagram illustrating a configuration example of a communication system 1 according to a first embodiment.

FIG. 1 is a diagram illustrating a configuration example of a communication system 1 according to the present embodiment. The communication system 1 according to the present embodiment includes a base station apparatus 10 and a terminal apparatus 20. Coverage 10*a* is a range (a communication area) in which the base station apparatus 10 can connect to the terminal apparatuses 20 (coverage 10*a* is also referred to as a cell). Note that the base station apparatus 10 can accommodate multiple terminal apparatuses 20 in the coverage 10*a*. The communication system 1 is a system in which the base station apparatus 10 and the terminal apparatuses 20 can perform data modulation and demodulation using a modulation scheme of Binary Phase Shift Keying (BPSK), Quadrature Phase Shift Keying (QPSK), 16 quadrature amplitude modulation (QAM), 64QAM, 256QAM, or 1024QAM.

In FIG. 1, an uplink radio communication r30 includes the following uplink physical channels. The uplink physical channels are used for transmitting information output from a higher layer.

Physical uplink control channel (PUCCH)

Physical uplink shared channel (PUSCH)

Physical random access channel (PRACH)

The PUCCH is a physical channel that is used to transmit Uplink Control Information (UCI). The uplink control information includes positive acknowledgement (ACK)/Negative acknowledgement (NACK) in response to downlink data (a Downlink transport block, a Medium Access Control Protocol Data Unit (MAC PDU), a Downlink-Shared Channel (DL-SCH), and a Physical Downlink Shared Channel (PDSCH). The ACK/NACK is also referred to as a Hybrid Automatic Repeat request ACKnowledgement (HARQ-ACK), a HARQ feedback, a HARQ response, or a signal indicating HARQ control information or a delivery confirmation.

The uplink control information includes a Scheduling Request (SR) used to request a PUSCH (Uplink-Shared Channel (UL-SCH)) resource for initial transmission. The scheduling request includes a positive scheduling request or a negative scheduling request. The positive scheduling request indicates to request a UL-SCH resource for initial transmission. The negative scheduling request indicates not to request the UL-SCH resource for the initial transmission.

The uplink control information includes downlink Channel State Information (CSI). The downlink channel state information includes a Rank Indicator (RI) indicating a preferable spatial multiplexing order (the number of layers), a Precoding Matrix Indicator (PMI) indicating a preferable precoder, a Channel Quality Indicator (CQI) designating a preferable transmission rate, and the like. The PMI indicates a codebook determined by the terminal apparatus. The codebook is related to precoding of the physical downlink shared channel. The CQI can use an index (CQI index) indicative of a preferable modulation scheme (for example, QPSK, 16QAM, 64QAM, 256QAM, 1024QAM, or the like), a preferable coding rate, and preferable frequency utilization efficiency in a predetermined band. The terminal apparatus selects a CQI index where a transport block on the PDSCH would be receivable without in excess of a predetermined block error probability (for example, an error rate of 0.1) from the CQI table.

FIG. 2 is a diagram illustrating an example of the CQI table according to the present embodiment. The CQI index is associated with the modulation scheme, the coding rate, and the frequency utilization efficiency. In the CQI table (64QAM mode CQI table) in FIG. 2, the CQI index indicates the QPSK, the 16QAM, or the 64QAM as the modulation scheme. FIG. 3 is a diagram illustrating another example of the CQI table according to the present embodiment. In the CQI table (256QAM mode CQI table) in FIG. 3, the CQI index indicates the QPSK, the 16QAM, the 64QAM, or the 256QAM as the modulation scheme. FIG. 4 is a diagram illustrating yet another example of the CQI table according to the present embodiment. In the CQI table (1024QAM mode CQI table) in FIG. 4, the CQI index indicates the QPSK, the 16QAM, the 64QAM, the 256QAM, or the 1024QAM as the modulation scheme. The CQI tables from FIG. 2 to FIG. 4 are shared in the communication system 1 (base station apparatus 10 and terminal apparatus 20). The CQI table in FIG. 2 can be a reference table. In this case, in a case that the base station apparatus 10 does not select the CQI table in FIG. 3 or FIG. 4, an interpretation of the CQI index reported by the terminal apparatus 20 is based on the CQI table in FIG. 2. In a case that the base station apparatus selects the CQI table in FIG. 3, the interpretation of the CQI index reported by the terminal apparatus 20 is based on the CQI table in FIG. 3. In a case that the base station apparatus selects the CQI table in FIG. 4, the interpretation of the CQI index reported by the terminal apparatus 20 is based on the CQI table in FIG. 4.

The downlink channel state information can be transmitted periodically/non-periodically. The periodic channel state information (Periodic CSI) is transmitted on the uplink control channel. A periodic transmission interval of the channel state information is configured by RRC signaling on the PDSCH in a Radio Resource Control (RRC) layer. Non-periodic channel state information (Aperiodic CSI) is transmitted on the physical uplink shared channel described later. A request for non-periodic channel state information is notified with Downlink Control Information (DCI) described later.

The PUSCH is a physical channel used to transmit uplink data (an Uplink Transport Block, an Uplink-Shared Channel (UL-SCH)). The PUSCH may be used to transmit the HARQ-ACK in response to downlink data and/or the channel state information along with the uplink data. The PUSCH may be used to transmit only the channel state information. The PUSCH may be used to transmit only the HARQ-ACK and the channel state information.

The PUSCH is used to transmit Radio Resource Control (RRC) signaling. The RRC signaling is also referred to as an RRC message/RRC layer information/an RRC layer signal/an RRC layer parameter/an RRC information element. The RRC signaling is information/signal processed in a radio resource control layer. The RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user equipment-specific (user equipment-unique) information is transmitted using the signaling dedicated to the certain terminal apparatus. The RRC message can include a UE Capability of the terminal apparatus. The UE Capability is information indicating a function supported by the terminal apparatus.

The PUSCH is used to transmit a Medium Access Control Element (MAC CE). The MAC CE is information/signal processed (transmitted) in a Medium Access Control layer. For example, a power headroom may be included in the MAC CE and may be reported via the physical uplink shared channel. In other words, a MAC CE field is used to indicate a level of the power headroom. The uplink data can include the RRC message and the MAC CE. The RRC signaling and/or the MAC CE is also referred to as a higher layer signaling (higher layer signaling). The RRC signaling and/or the MAC CE are/is included in a transport block.

The PRACH is used to transmit a preamble used for random access. The PRACH is used to transmit a random access preamble. The PRACH is used for indicating an initial connection establishment procedure, a handover procedure, a connection re-establishment procedure, synchronization (timing adjustment) for uplink transmission, and a request for the PUSCH (UL-SCH) resource.

In the uplink radio communications, an Uplink Reference Signal (UL RS) is used as an uplink physical signal. The uplink physical signal is not used for transmission of information output from higher layers, but is used by the physical layer. The uplink reference signal includes a Demodulation Reference Signal (DMRS) and a Sounding Reference Signal (SRS). The DMRS is associated with transmission of the physical uplink shared channel/the physical uplink control channel. For example, the base station apparatus 10 uses the demodulation reference signal to perform channel estimation/channel compensation in a case of demodulating the physical uplink shared channel/the physical uplink control channel.

The SRS is not associated with the transmission of the physical uplink shared channel/the physical uplink control channel. The base station apparatus 10 uses the SRS to measure an uplink channel state (CSI Measurement).

In FIG. 1, the following downlink physical channels are used in radio communications of the downlink r31. The downlink physical channels are used for transmitting information output from the higher layer.

- Physical Broadcast Channel (PBCH)
- Physical Control Format Indicator Channel (PCFICH)
- Physical Hybrid Automatic Repeat Request Indicator Channel (PHICH)
- Physical Downlink Control Channel (PDCCH)
- Enhanced Physical Downlink Control Channel (EPDCCH)
- Physical Downlink Shared Channel (PDSCH)
- Physical Multicast Channel (PMCH)

The PBCH is used for broadcasting a Master Information Block (MIB, a Broadcast Channel (BCH)) that is shared by the terminal apparatuses. The MIB is one of system information. For example, the PBCH includes a downlink transmission bandwidth configuration, a PHICH configuration, and a System Frame number (SFN).

The PCFICH is used to transmit information indicating an area (control area) for transmission of the PDCCH (the number of OFDM symbols for transmission of the PDCCH). The base station apparatus and the terminal apparatus can grasp a start point of an area to which the PDSCH is mapped with information indicating the control area.

The PHICH is used for transmission of an HARQ indicator (HARQ feedback or response information) indicating the ACKnowledgement (ACK) or the Negative ACKnowledgement (NACK) for the uplink data (UpLink Shared Channel (UL-SCH)) received by the base station apparatus.

The PDCCH and the EPDCCH are used to transmit the Downlink Control Information (DCI). In the present embodiment, the "PDCCH" is assumed to include the "EPDCCH" for the sake of convenience. For the downlink control information, multiple formats based on applications (also referred to as DCI formats) are defined. Each format is used depending on the application. The downlink control information includes control information for downlink data transmission and control information for uplink data transmission. The DCI format for downlink data transmission is also referred to as a downlink assignment (or a downlink grant). The DCI format for uplink data transmission is also referred to as an uplink grant (or an uplink assignment).

The downlink assignment is used for scheduling the PDSCH. The downlink assignment includes downlink control information, such as resource block assignments for the PDSCH, the Modulation and Coding Scheme (MCS) for the PDSCH, HARQ information (a NEW Data Indicator (NDI) to indicate initial transmission or retransmission) and information indicating a HARQ process number in downlink. The downlink assignment may include a Transmission Power Control (TPC) command to the physical uplink channel (for example, the physical uplink control channel and the physical uplink shared channel).

The MCS to the PDSCH can be indicated using an index (MCS index) made to correspond to a modulation order and a Transport Block Size (TBS) index of the PDSCH. The modulation order is made to correspond to the modulation scheme. The modulation orders "2," "4," "6," "8," and "10," indicate "QPSK," "16QAM," "64QAM," "256QAM," and "1024QAM," respectively. The TBS index is an index used to identify the transport block size of the PDSCH scheduled with the PDCCH. The communication system 1 (the base station apparatus 10 and the terminal apparatus 20) shares a table (transport block size table) with which the transport block size can be identified by the TBS index and the number of resource blocks allocated for the PDSCH transmission.

FIG. 5 is a diagram illustrating an example of an MCS table according to the present embodiment. The MCS index is associated with the modulation order and the TBS index. The MCS index in the MCS table (64QAM mode MCS table) in FIG. 5 indicates the modulation order "2," "4," or "6." FIG. 6 is a diagram illustrating another example of the MCS table according to the present embodiment. The MCS index in the MCS table (256QAM mode MCS table) in FIG. 6 indicates the modulation order "2," "4," "6," or "8." FIG. 7 is a diagram illustrating yet another example of the MCS table according to the present embodiment. The MCS index (1024QAM mode MCS table) in FIG. 7 indicates the modulation order "2," "4," "6," "8," or "10." An MCS index with the TBS index of "reserved" can be used during retransmission. The MCS tables in FIG. 5 to FIG. 7 are shared in the communication system 1 (the base station apparatus 10 and the terminal apparatus 20). The MCS table in FIG. 5 can be a reference table. In this case, in a case that the base station apparatus 10 does not configure an MCS table selection of FIG. 6 or FIG. 7, an interpretation of the MCS index included in the DCI with a CRC scrambled with a C-RNTI is based on the MCS table in FIG. 5. In a case that the base station apparatus 10 selects the MCS table in FIG. 6, the interpretation of the MCS index included in predetermined DCI with the CRC scrambled with the C-RNTI is based on the MCS table in FIG. 6. In a case that the base station apparatus 10 selects the MCS table in FIG. 7, the interpretation of the MCS index included in the predetermined DCI with the CRC scrambled with the C-RNTI is based on the MCS table in FIG. 7.

Note that the 64QAM mode refers to a configuration (structure) where the modulation order of 256QAM or more is not included as the modulation scheme constituting the MCS table applied to the PDSCH, a configuration (structure) where the modulation scheme constituting the MCS table applied to the PDSCH includes the QPSK, the 16QAM, and the 64QAM, a configuration (structure) where the modulation order of 256QAM or more as the modulation scheme constituting the CQI table used for a CQI report is not included, a configuration (structure) where the modulation scheme constituting the CQI table used for the CQI report includes the QPSK, the 16QAM, and the 64QAM, or a similar configuration (structure). The 256QAM mode indicates a configuration using the MCS table/CQI table or the like assuming data modulation of the PDSCH at 256QAM. The 256QAM mode refers to a configuration (structure) where at least the 256QAM is included as the modulation scheme constituting the MCS table applied to the PDSCH, a configuration (structure) where the modulation scheme constituting the MCS table applied to the PDSCH includes the QPSK, the 16QAM, the 64QAM, and the 256QAM, a configuration (structure) where the 256QAM is included as the modulation scheme constituting the CQI table used for the CQI report, a configuration (structure) where the modulation scheme constituting the CQI table used for the CQI report includes the QPSK, the 16QAM, the 64QAM, and the 256QAM, or a similar configuration (structure). The 1024QAM mode indicates a configuration using the MCS table/CQI table or the like assuming data modulation of the PDSCH at 1024QAM. The 1024QAM mode refers to a configuration (structure) where at least the 1024QAM is included as the modulation scheme constituting the MCS table applied to the PDSCH, a configuration (structure) where the modulation scheme constituting the MCS table applied to the PDSCH includes the QPSK, the 16QAM, the 64QAM, the 256QAM, and the 1024QAM, a configuration (structure) where the 1024QAM is included as the modulation scheme constituting the CQI table used for the CQI report, a configuration (structure) where the modulation scheme constituting the CQI table used for the CQI report includes the QPSK, the 16QAM, the 64QAM, the 256QAM, and the 1024QAM, or a similar configuration (structure). In the MCS table/CQI table, the 64QAM mode/256QAM mode/1024QAM mode is changed by a predetermined parameter (RRC message) provided from the higher layer (details will be described later).

The uplink grant is used for notifying the terminal apparatus of the scheduling of the PUSCH. The uplink grant includes uplink control information, such as information on the resource block allocation for transmission of the PUSCH, information on the MCS for the PUSCH, information on retransmission of the PUSCH, a TPC command for the PUSCH, and a request for downlink Channel State Information (CSI) (CSI request).

The PDCCH is generated by adding a Cyclic Redundancy Check (CRC) to the downlink control information. In the PDCCH, CRC parity bits are scrambled with a predetermined identifier (also referred to as an exclusive OR operation, mask). The parity bits are scrambled with a Cell-Radio Network Temporary Identifier (C-RNTI), a Semi Persistent Scheduling (SPS) C-RNTI, a Temporary C-RNTI, Paging (P)-RNTI, a System Information (SI)-RNTI, or a Random Access (RA)-RNTI. The C-RNTI and the SPS C-RNTI are identifiers for identifying a terminal apparatus within a cell. The Temporary C-RNTI is an identifier for identifying the terminal apparatus that has transmitted a random access preamble in a contention based random access procedure. The C-RNTI and the Temporary C-RNTI are used to control PDSCH transmission or PUSCH transmission in a single subframe. The SPS C-RNTI is used to periodically allocate a resource for the PDSCH or the PUSCH. The P-RNTI is used to transmit a paging message (Paging Channel (PCH)). The SI-RNTI is used to transmit the SIB, and the RA-RNTI is used to transmit a random access response (a message 2 in a random access procedure).

The PDSCH is used to transmit the downlink data (the downlink transport block, DL-SCH). The PDSCH is used to transmit a system information message (System Information Block, also referred to as an SIB). Some or all of the SIBs can be included in the RRC message.

The PDSCH is used to transmit the RRC signaling. The RRC signaling transmitted from the base station apparatus may be shared by the multiple terminal apparatuses in the cell (unique to the cell). That is, information common to user equipment in the cell is transmitted using the cell-unique RRC signaling. The RRC signaling transmitted from the base station apparatus may be a message dedicated to a certain terminal apparatus (also referred to as dedicated signaling). In other words, user equipment-specific (user equipment-unique) information is transmitted using the message dedicated to the certain terminal apparatus.

The PDSCH is used to transmit the MAC CE. The RRC signaling and/or the MAC CE is also referred to as a higher layer signal (higher layer signaling). The PMCH is used to transmit multicast data (Multicast Channel (MCH)).

In the downlink radio communication in FIG. 1, a Synchronization signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in a frequency domain and a time domain in the downlink. The downlink reference signal is used for the terminal apparatus to perform the channel estimation/channel compensation on the downlink physical channel. For example, the downlink reference signal is used to demodulate the PBCH, the PCSCH, and the PDCCH. The downlink reference signal is usable for the terminal apparatus to measure the downlink channel state (CSI measurement). The downlink reference signal includes a Cell-specific Reference Signal (CRS), a UE-specific Reference Signal (URS) related to the PDSCH, a Demodulation Reference Signal (DMRS) related to the EPDCCH, a Non-Zero Power Chanel State Information-Reference Signal (NZP CSI-RS), a Zero Power Chanel State Information-Reference Signal (ZP CSI-RS), and the like. The terminal apparatus 20 may perform demodulation and CSI measurement on various channels using a common reference signal (for example, the CRS). The reference signal used to demodulate the various channels may differ from the reference signal used for CSI measurement.

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the MCH, the UL-SCH, and the DL-SCH are transport channels. Channels used in the MAC layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Figure 8:
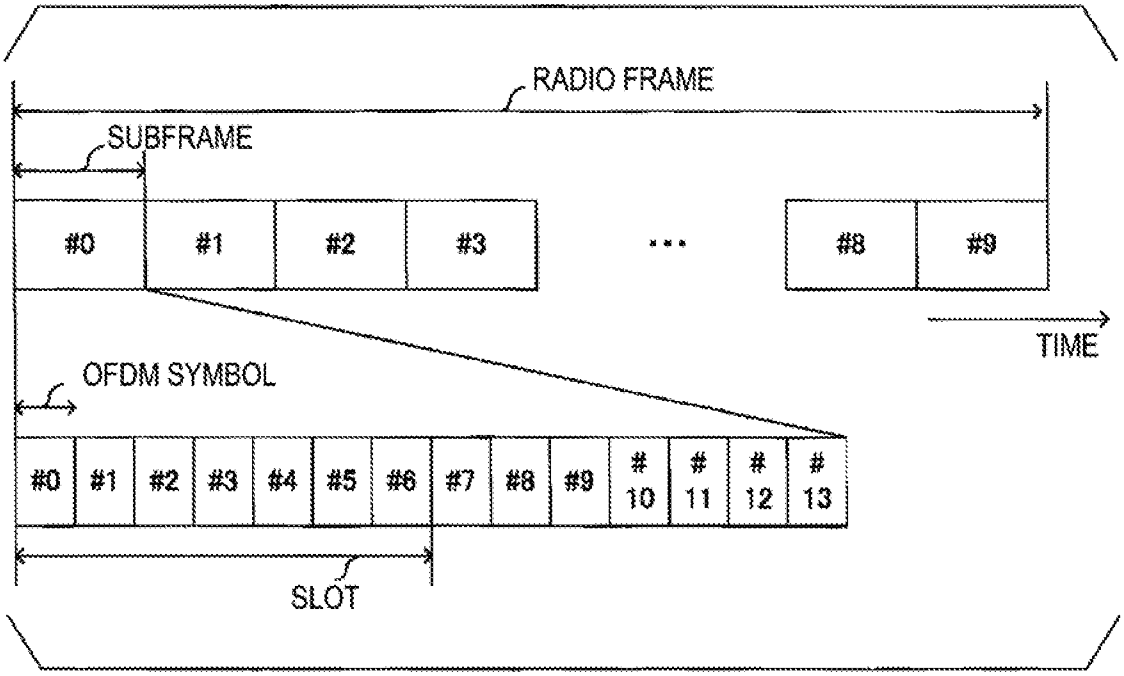
FIG. 8 is a diagram illustrating an example of a radio frame configuration of the communication system 1 according to the first embodiment.

FIG. 8 is a diagram illustrating an example of a radio frame configuration for the communication system 1 according to the present embodiment. One radio frame includes multiple subframes. In FIG. 2, one radio frame includes 10 subframes. One subframe includes multiple OFDM symbols. In FIG. 2, one subframe includes 14 OFDM symbols. The communication system 1 can use the subframe as a unit for the base station apparatus 10 to indicate scheduling (mapping to radio resources) of the physical channel (for example, the PDSCH and the PUSCH). One subframe includes multiple slots. In FIG. 2, one subframe includes two slots. That is, one slot includes seven OFDM symbols. The communication system 1 may use a slot as a unit for the base station apparatus 10 to indicate the scheduling of the physical channel. Note that, in communications using the DFT-s-OFDM, the OFDM symbol becomes a Single Carrier-Frequency Division Multiple Access (SC-FDMA) symbol.

Figure 9:
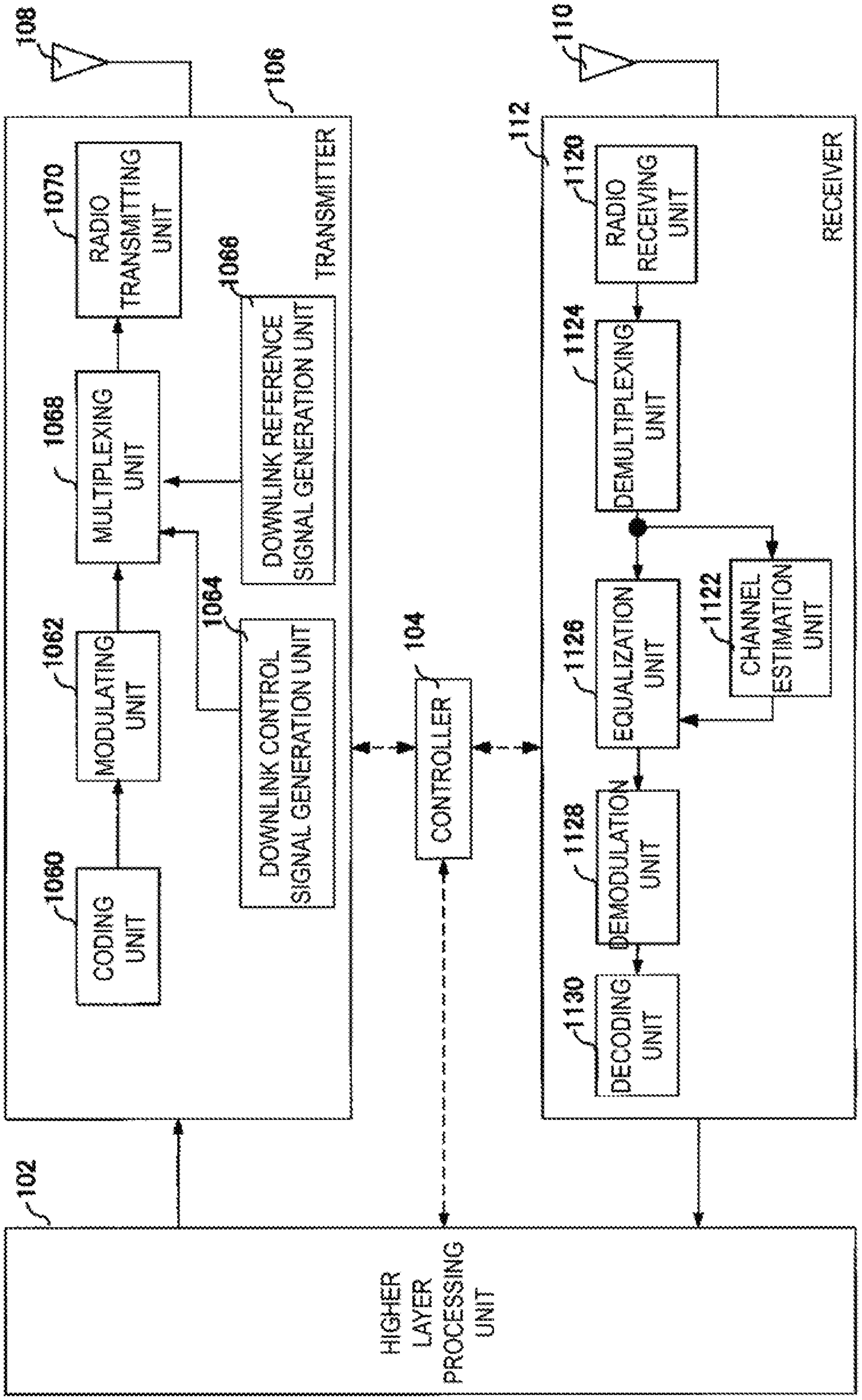
FIG. 9 is a schematic block diagram of a configuration of a base station apparatus 10 according to the first embodiment.

FIG. 9 is a schematic block diagram of a configuration of the base station apparatus 10 according to the present embodiment. The base station apparatus 10 includes a higher layer processing unit (higher layer processing step) 102, a controller (control step) 104, a transmitter (transmitting step) 106, a transmit antenna 108, a receive antenna 110, and a receiver (receiving step) 112. The transmitter 106 generates a downlink transmission signal (physical downlink channel) in accordance with a logical channel input from the higher layer processing unit 102. The transmitter 106 includes a coding unit (coding step) 1060, a modulating unit (modulating step) 1062, a downlink control signal generation unit (downlink control signal generating step) 1064, a downlink reference signal generation unit (downlink reference signal generating step) 1066, a multiplexing unit (multiplexing step) 1068, and a radio transmitting unit (radio transmitting step) 1070. The receiver 112 detects (demodulates, decodes, or the like) the physical uplink channel and inputs the content to the higher layer processing unit 102. The receiver 112 includes a radio receiving unit (radio receiving step) 1120, a channel estimation unit (channel estimating step) 1122, a demultiplexing unit (demultiplexing step) 1124, an equalization unit (equalizing step) 1126, a demodulation unit (demodulating step) 1128, and a decoding unit (decoding step) 1130.

The higher layer processing unit 102 performs processing on a layer higher than the physics layer, such as a Medium Access Control (MAC) layer, a Packet Data Convergence Protocol (PDCP) layer, a Radio Link Control (RLC) layer, and a Radio Resource Control (RRC) layer. The higher layer processing unit 102 generates information needed to control the transmitter 106 and the receiver 112, and outputs the resultant information to the controller 104. The higher layer processing unit 102 outputs downlink data (DL-SCH and the like), system information (MIB, SIB), a Hybrid Automatic Request indicator (HARQ indicator), and the like to the transmitter 106.

The higher layer processing unit 102 generates the system information (a part of the MIB or the SIB) to be broadcasted or acquires the system information from a higher node. The higher layer processing unit 102 outputs the system information to be broadcasted to the transmitter 106 as BCH/DL-SCH. The MIB is allocated on the PBCH in the transmitter 106. The SIB is allocated on the PDSCH in the transmitter 106.

The higher layer processing unit 102 configures various RNTIs for the respective terminal apparatuses. The RNTI is used for encryption (scrambling) of the PDCCH, the PDSCH, and the like. The higher layer processing unit 102 outputs configuration information on the identifier to the controller 104/transmitter 106/receiver 112.

The higher layer processing unit 102 generates the downlink data (transport blocks, DL-SCH), a System Information Block (SIB) unique to the terminal apparatus, the RRC message, the MAC CE, and the like allocated on the PDSCH or acquires them from the higher node, and outputs them to the transmitter 106. The higher layer processing unit 102 manages various pieces of configuration information of the terminal apparatus 20. Note that some functions of the radio resource control may be performed in the MAC layer or the physical layer.

The RRC message includes configuration information for the CQI report (also referred to as a CSI report). The configuration information for the CQI report includes parameters of CQI report configuration for the 256QAM mode (256QAM mode CQI report configuration) and CQI report configuration for the 1024QAM mode (1024QAM mode CQI report configuration). The 256QAM mode CQI report configuration is configuration to perform the CQI report using a 64QAM mode CQI table (the CQI table in FIG. 3) and a 256QAM mode CQI table (the CQI table in FIG. 4). The 1024QAM mode CQI report configuration is configuration to perform the CQI report using the 64QAM mode CQI table (the CQI table in FIG. 3) and a 1024QAM mode CQI table (the CQI table in FIG. 5).

In the present embodiment, each of the 256QAM mode CQI report configuration and the 1024QAM mode CQI report configuration have two parameters: "CSI measurement subframe set" and "CQI table selection." The "CSI measurement subframe set" is information indicating a subframe group on which the CSI measurement is performed using the same CQI table. The "CSI measurement subframe set" indicates two subframe sets with a bit map corresponding to the subframes. For example, in a case that the "CSI measurement subframe set" including 10 bits is configured as (1, 0, 1, 0, 1, 0, 1, 0, 1, 0), respective bits match subframes #0, #1, . . . #9 in the order from the left bit. In this case, the "CSI measurement subframe set" indicates a "first CSI subframe set" including the subframes #1, #3, #5, #7, and #9 corresponding to "0" and a "second CSI subframe set" including the subframes #0, #2, #4, #6, and #8 corresponding to "1." Note that the "CSI measurement subframe set" can be grouped in units of slots. In this case, the "CSI measurement subframe set" includes a 20-bit bitmap, and each bit corresponds to the slot number.

The "CQI table selection" parameter in the 256QAM mode CQI report configuration information is configuration information indicating subframes to which the 256QAM mode CQI table is applied. The higher layer processing unit 102 configures "all subframes," the "first CSI subframe set," or the "second CSI subframe set" to the "CQI table selection." In a case that "all subframes" is configured, this indicates that the "CQI table selection" applies the 256QAM mode CQI table to CQI reports of all subframes. In a case that the "first CSI measurement subframe set" is configured, this indicates that the "CQI table selection" applies the 256QAM mode CQI table to CQI reports of subframes included in the first CSI subframe set. This further indicates that the "CQI table selection" applies the 64QAM mode CQI table (in other words, a reference CQI table) to CQI reports of subframes (#0, #2, #4, #6, and #8) not included in the first CSI subframe set. On the other hand, in a case that the "second CSI subframe set" is configured, this indicates that the "CQI table selection" applies the 256QAM mode CQI table to CQI reports of subframes included in the "second CSI subframe set." This further indicates that the "CQI table selection" applies the 64QAM mode CQI table to CQI reports of subframes (#1, #3, #5, #7, and #9) not included in the second CSI subframe set.

Similarly, the 1024QAM mode CQI report configuration has two parameters: "CSI measurement subframe set" and "CQI table selection." As described above, the "CSI measurement subframe set" indicates two subframe sets with a bit map corresponding to the subframes. The "CQI table selection" in the 1024QAM mode CQI report configuration information is configuration information indicating subframes to which the 1024QAM mode CQI table is applied. The higher layer processing unit 102 configures "all subframes," the "first CSI subframe set," or the "second CSI subframe set" to the "CQI table selection." In a case that "all subframes" is configured, this indicates that the "CQI table selection" applies the 1024QAM mode CQI table to CQI reports of all subframes. In a case that the "first CSI subframe set" is configured, this indicates that the "CQI table selection" applies the 1024QAM mode CQI table to CQI reports of subframes included in the first CSI subframe set. This further indicates that the "CQI table selection" applies the 64QAM mode CQI table (in other words, a reference CQI table) to CQI reports of subframes (#0, #2, #4, #6, and #8) not included in the first CSI subframe set. On the other hand, in a case that the "second CSI subframe set" is configured, this indicates that the "CQI table selection" applies the 1024QAM mode CQI table to CQI reports of subframes included in the second CSI subframe set. This further indicates that the "CQI table selection" applies the 64QAM mode CQI table to CQI reports of subframes (#1, #3, #5, #7, and #9) not included in the second CSI subframe set.

Figure 10:
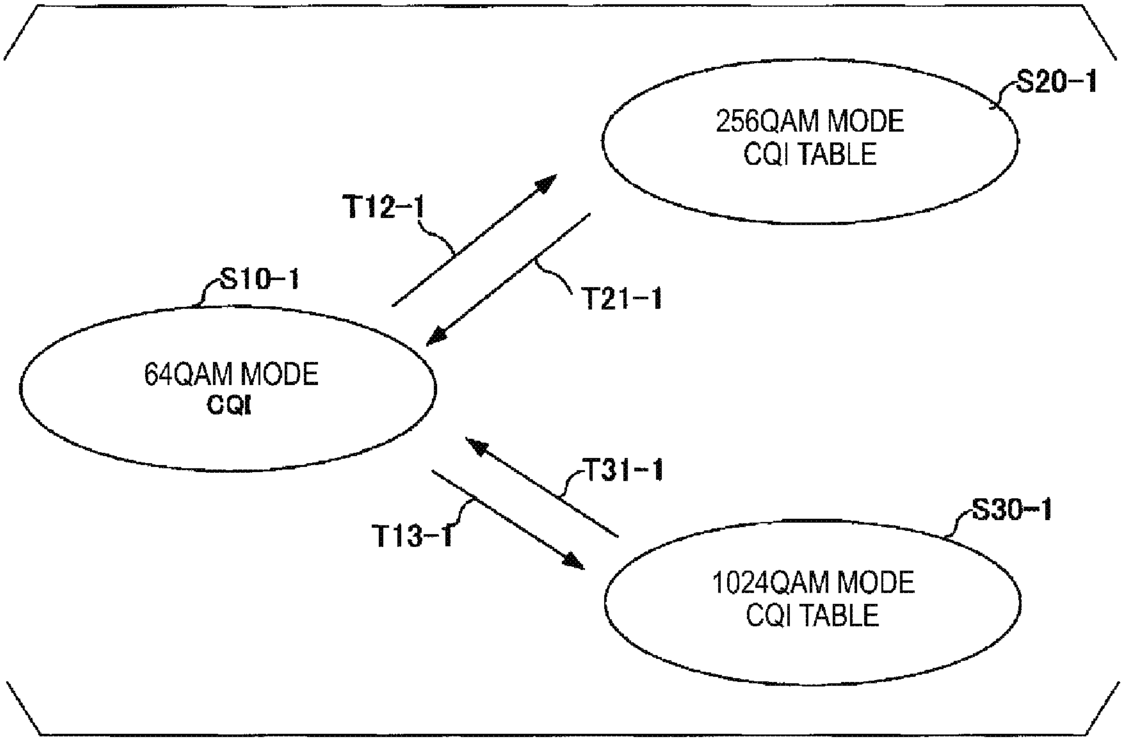
FIG. 10 is a diagram illustrating an example of state transition of the CQI table according to a first embodiment.

FIG. 10 is a diagram illustrating an example of state transition of the CQI table according to the present embodiment. In FIG. 10, a 64QAM mode CQI (S10-1) indicates a state of performing the CQI report using only the 64QAM mode CQI table (or a state of performing the CQI report applying the reference table). A 256QAM mode CQI (S20-1) indicates a state of performing the CQI report using the 64QAM mode CQI table/256QAM mode CQI table (or a state of performing the CQI report applying the reference table). A 1024QAM mode CQI (S30-1) indicates a state of performing the CQI report using the 64QAM mode CQI table/1024QAM mode CQI table (or a state of performing the CQI report applying the reference table). The communication system according to the present embodiment is restricted to state transition between the 64QAM mode CQI and the 256QAM mode CQI (T12-1, T21-1) and state transition between the 64QAM mode CQI and the 1024QAM mode CQI (T13-1, T31-1) (state transition between the 256QAM mode CQI and the 1024QAM mode CQI is prohibited).

The state transition T12-1 is performed by 256QAM mode CQI report configuration indicating that the "CQI table selection" is set. The state transition T21-1 is performed by 256QAM mode CQI report configuration indicating that the "CQI table selection" is released. The state transition T13-1 is performed by 1024QAM mode CQI report configuration indicating that the "CQI table selection" is set. The state transition T21-1 is performed by the 1024QAM mode CQI report configuration indicating that the "CQI table selection" is released. Thus, the state transition from the 256QAM mode CQI (S20-1) to the 1024QAM mode CQI (S30-1) is performed by transmitting CQI report configuration information including the 256QAM mode CQI report configuration indicating that the "CQI table selection" is released and the 1024QAM mode CQI report configuration indicating that the "CQI table selection" is set. 'The "CQI table selection" is set"' is indicated by configuring any of the "all subframes," the "first CSI subframe set," or the "second CSI subframe set" to "the CQI table selection."

The communication system 1 does not exclude that both the 256QAM mode CQI report configuration and the 1024QAM mode CQI report configuration are set in the CQI report configuration information. In a case that both are set, the content of the 1024QAM mode CQI report configuration is prioritized. As a prioritization method, the 1024QAM mode CQI report configuration is prioritized in all subframes. Alternatively, as another prioritization method, the 1024QAM mode CQI table may be applied only in subframes where the application of the 1024QAM mode CQI table and the application of the 256QAM mode CQI table collide (collision). In this case, the 256QAM mode CQI table is applied to subframes to which the application of the 256QAM mode CQI table is configured and subframes to which non-application of the 1024QAM mode CQI table is configured.

The higher layer processing unit 102 receives information on the terminal apparatus, such as the function supported by the terminal apparatus (UE capability), from the terminal apparatus 20 (via the receiver 112). The terminal apparatus 20 transmits its function to the base station apparatus 10 by a signal on the higher layer (RRC signaling). The information on the terminal apparatus includes information indicating whether the terminal apparatus supports a predetermined function or information indicating that the terminal apparatus has completed introduction and testing of the predetermined function. The information indicating whether the predetermined function is supported includes information indicating whether the introduction and testing of the predetermined function have been completed.

In a case that the terminal apparatus supports the predetermined function, the terminal apparatus transmits information (parameters) indicating whether the predetermined function is supported. In a case that the terminal apparatus does not support the predetermined function, the terminal apparatus may be configured not to transmit information (parameters) indicating whether the predetermined function is supported. In other words, whether the predetermined function is supported is notified by whether information (parameters) indicating whether the predetermined function is supported is transmitted. The information (parameters) indicating whether the predetermined function is supported may be notified using one bit of 1 or 0.

The UE capability includes information indicating whether the terminal apparatus 20 supports the 256QAM mode CQI report configuration/1024QAM mode CQI report configuration. The higher layer processing unit 102/controller 104 performs the 256QAM mode CQI report configuration/1024QAM mode CQI report configuration based on the UE capability.

The higher layer processing unit 102 receives the CSI report (Aperiodic CSI) included in the PDSCH from the terminal apparatus 20 via the receiver 112. The higher layer processing unit 102 inputs the CQI index included in the CSI report to the controller 104.

The higher layer processing unit 102 acquires the DL-SCH from the uplink data (including the CRC) after being decoded from the receiver 112. The higher layer processing unit 102 performs error detection on the uplink data transmitted by the terminal apparatus. For example, the error detection is performed in the MAC layer. The higher layer processing unit 102 generates a HARQ indicator (a bit sequence indicating the ACK/NACK) based on the error detection result. The HARQ indicator for the uplink data is output for each transport block. The higher layer processing unit 102 outputs the HARQ indicator to the transmitter 106. For example, each one bit of ACK "1" and NACK "0" is output. The HARQ indicator is used to generate the PHICH/PDCCH.

Based on the various pieces of configuration information input from the higher layer processing unit 102/receiver 112, the controller 104 controls the transmitter 106 and the receiver 112. The controller 104 generates the downlink control information (DCI) based on the configuration information input from the higher layer processing unit 102/receiver 112, and outputs the generated downlink control information to the transmitter 106. In consideration of the CSI report (Aperiodic CQI/Periodic CQI) input from the higher layer processing unit 102/receiver 112, the controller 104 determines the MCS performed on the PDSCH. Note that some functions of the controller 104 can be included in the higher layer processing unit 102.

Figure 11:
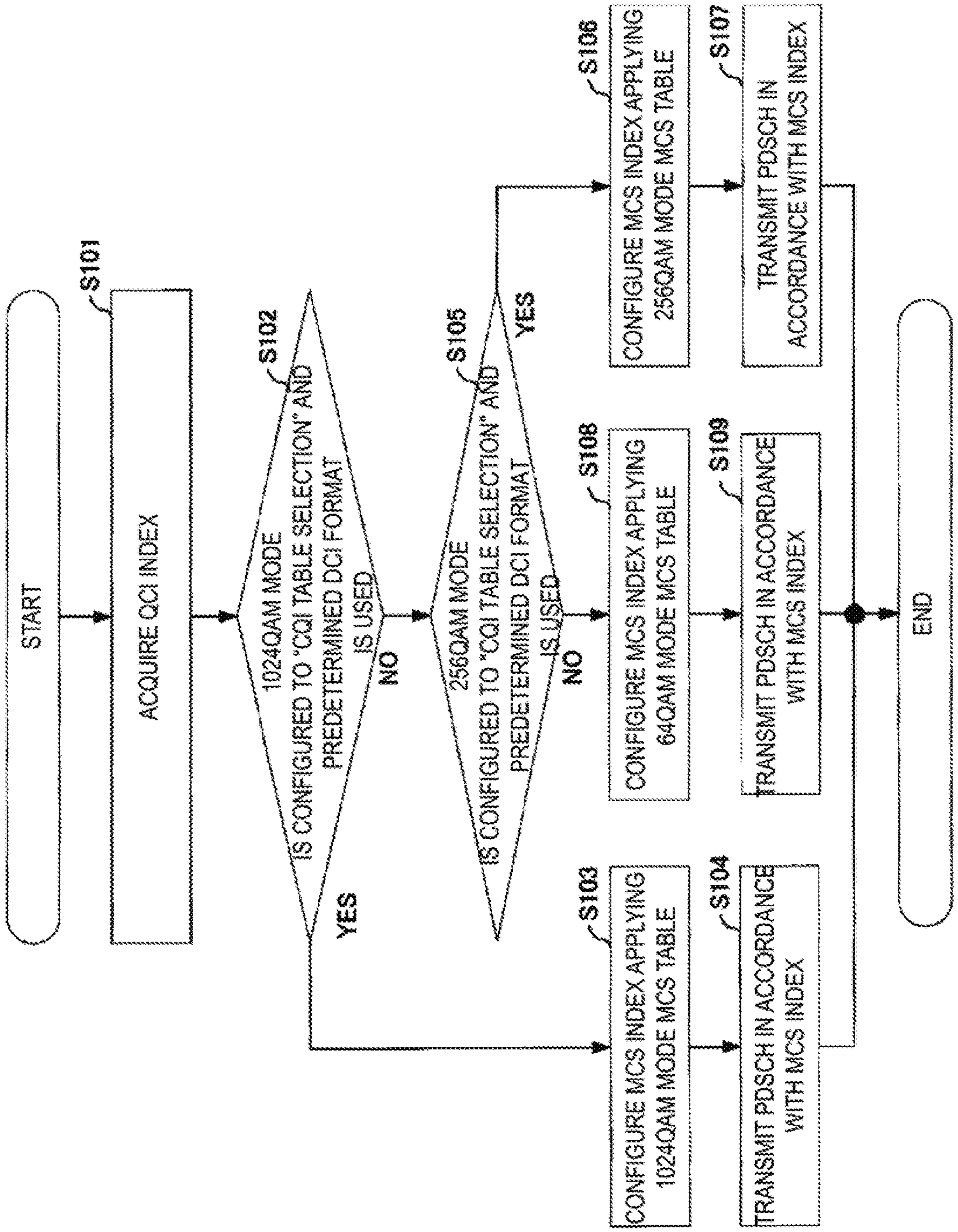
FIG. 11 is a diagram illustrating an example of a configuration flow for an MCS according to the first embodiment.

FIG. 11 is a diagram illustrating an example of a configuration flow for the MCS according to the present embodiment. The controller 104 holds the CQI tables in FIG. 2 to FIG. 4 and the MCS tables in FIG. 5 to FIG. 7. In a case that the DCI with the CRC scrambled with the RNTI except for the P-RNTI, the RA-RNTI, and the SI-RNTI is used, the controller 104 determines the modulation scheme of the PDSCH by the procedure in FIG. 11. The controller 104 acquires the CQI index included in the CSI report (S101). The CQI index indicates a modulation scheme and a coding rate preferable for the terminal apparatus 20. In addition to the transport block size of the PDSCH and the bandwidth used for PDSCH transmission (the number of resource blocks), the controller 104 determines the modulation order used for the PDSCH in consideration of the content of the CQI index.

In a case that the higher layer processing unit 102 configures the selection of the 1024QAM mode CQI table, to allocate the PDSCH with the PDCCH/EPDCCH having a predetermined DCI format (YES of S102), the controller 104 uses the 1024QAM mode CQI table and the MCS index to determine the modulation order used for the PDSCH. The controller 104 includes the MCS index configured using the 1024QAM mode CQI table in the DCI (S103). The controller 104 further inputs the modulation order indicated by the MCS index to the transmitter 106. The transmitter 106 transmits the PDSCH modulated based on the modulation order (S104).

In a case of NO in Step S102, the higher layer processing unit 102 determines whether the 256QAM mode CQI table selection is configured (S105). In a case that the higher layer processing unit 102 configures the 256QAM mode in the "CQI table selection," to allocate the PDSCH with the PDCCH/EPDCCH having the predetermined DCI format (YES of S105), the controller 104 uses the 256QAM mode CQI table and the MCS index to determine the modulation order used for the PDSCH. The controller 104 includes the MCS index configured using the 1024QAM mode CQI table in the DCI I (S106). The controller 104 further inputs the modulation order indicated by the MCS index to the transmitter 106. The transmitter 106 transmits the PDSCH modulated based on the modulation order (S107).

In a case of NO in Step S105 (that is, in a case that the conditions of S102 and S105 are not met), the controller 104 uses the 64QAM mode CQI table and the MCS index to determine the modulation order used for the PDSCH. The controller 104 includes the MCS index configured using the 64QAM mode CQI table in the DCI (S108). The controller 104 further inputs the modulation order indicated by the MCS index to the transmitter 106. The transmitter 106 transmits the PDSCH modulated based on the modulation order (S109). Here, the predetermined DCI format in S102 and S105 is a DCI format 1/1B/1D/2/2A/2B/2C/2D with the CRC scrambled with the C-RNTI. These DCI formats are formats with which the PDCCH transmission can be performed using a USS (user-unique search space) in addition to a CSS (cell-common search space). As described above, by the use of the three kinds of MCS tables/CSI tables of different modulation schemes selectable for the PDSCH, the range of the MCS selectable for the PDSCH can be flexibly changed according to a channel condition and an application.

Note that, with the controller 104, the "C-RNTI" can be replaced by the "SPS C-RNTI" in the predetermined DCI format in S102 and S105. Accordingly, the range of the MCS selectable for the PDSCH can be flexibly changed according to an application achieved using Semi-Persistent scheduling.

The transmitter 106 generates the PBCH, the PHICH, the PDCCH, the PDSCH, the downlink reference signal, and the like in accordance with the signal input from the higher layer processing unit 102/controller 104. The coding unit 1060 performs encoding (including repetition), such as block coding, convolutional coding, and turbo coding, on the BCH, the DL-SCH, the HARQ indicator, and the like input from the higher layer processing unit 102 using a predetermined coding scheme/coding scheme determined by the higher layer processing unit 102. The coding unit 1060 performs puncturing on the coded bits based on the coding rate input from the controller 104. The modulating unit 1062 performs data modulation on the coded bits input from the coding unit 1060 by the predetermined modulation scheme (modulation order)/modulation scheme (modulation order) input from the controller 104, such as the BPSK, QPSK, 16QAM, 64QAM, 256QAM, or 1024QAM.

The downlink control signal generation unit 1064 adds the CRC to the DCI input from the controller 104. The downlink control signal generation unit 1064 encrypts (scrambles) the CRC using the RNTI. Furthermore, the downlink control signal generation unit 1064 performs QPSK modulation on the DCI to which the CRC is added, and generates the PDCCH. The downlink reference signal generation unit 1066 generates a sequence known to the terminal apparatus as a downlink reference signal. The known sequence is obtained by a predetermined rule based on a physical cell identifier for identifying the base station apparatus 10 and the like.

The multiplexing unit 1068 multiplexes the PDCCHs/downlink reference signals/modulation symbols of the respective channels input from the modulating unit 1062. In other words, the multiplexing unit 1068 maps the PDCCHs/downlink reference signals/modulation symbols of the respective channels to the resource elements. The resource elements to which the mapping is performed are controlled by downlink scheduling input from the controller 104. The resource element is a minimum unit of a physical resource including one OFDM symbol and one subcarrier. Note that in a case of performing MIMO transmission, the transmitter 106 includes the coding units 1060 and the modulating units 1062 by the number of layers. In this case, the higher layer processing unit 102 configures the MCS to every transport block in each layer.

The radio transmitting unit 1070 performs Inverse Fast Fourier Transform (IFFT) on the multiplexed modulation symbols and the like to generate OFDM symbols. The radio transmitting unit 1070 adds cyclic prefixes (CPs) to the OFDM symbols to generate baseband digital signals. Furthermore, the radio transmitting unit 1070 converts the digital signal into an analog signal, removes extra frequency components from the analog signal by filtering, performs up-conversion to a carrier frequency, performs power amplification, and outputs it to the transmit antenna 108 for transmission.

In accordance with an indication from the controller 104, the receiver 112 detects (separates, demodulates, and decodes) the reception signal received from the terminal apparatus 20 through the receive antenna 110, and inputs the decoded data to the higher layer processing unit 102/controller 104. The radio receiving unit 1120 converts the uplink signal received through the receive antenna 110 into a baseband signal by down-conversion, removes unnecessary frequency components from the baseband signal, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1120 removes a part equivalent to the CPs from the converted digital signal. The radio receiving unit 1120 performs Fast Fourier Transform (FFT) on the signal from which the CPs have been removed, and extracts a signal in the frequency domain. The signal in the frequency domain is output to the demultiplexing unit 1124.

The demultiplexing unit 1124 separates the signals input from the radio receiving unit 1120 into signals such as the PUSCH, the PUCCH, and the uplink reference signal, based on uplink scheduling information (such as uplink data channel allocation information) input from the controller 104. The separated uplink reference signal is input to the channel estimation unit 1122. The separated PUSCH and PUCCH are output to the equalization unit 1126.

The channel estimation unit 1122 uses the uplink reference signal to estimate a frequency response (or delay profile). The frequency response result as a result of the channel estimation for demodulation is input to the equalization unit 1126. The channel estimation unit 1122 measures the uplink channel condition (measures a Reference Signal Received Power (RSRP), a Reference Signal Received Quality (RSRQ), and a Received Signal Strength Indicator (RSSI)) using the uplink reference signal. The measurement of the uplink channel condition is used to determine the MCS for the PUSCH and the like.

The equalization unit 1126 performs processing to compensate for an influence in a channel based on the frequency response input from the channel estimation unit 1122. As a method for the compensation, any existing channel compensation, such as a method of multiplying an MMSE weight or an MRC weight and a method of applying an MLD, is applicable. The demodulation unit 1128 performs demodulation processing based on the information on predetermined modulation scheme/modulation scheme indicated by the controller 104. In a case of the use of the DFT-s-OFDM in downlink, the demodulation unit 1128 performs demodulation processing on a resultant of IDFT processing performed on an output signal from the equalization unit 1126.

The decoding unit 1130 performs decoding processing on the output signal from the demodulation unit based on the information on predetermined coding rate/coding rate indicated by the controller 104. The decoding unit 1130 inputs the data after being decoded (such as the UL-SCH) to the higher layer processing unit 102.

Figure 12:
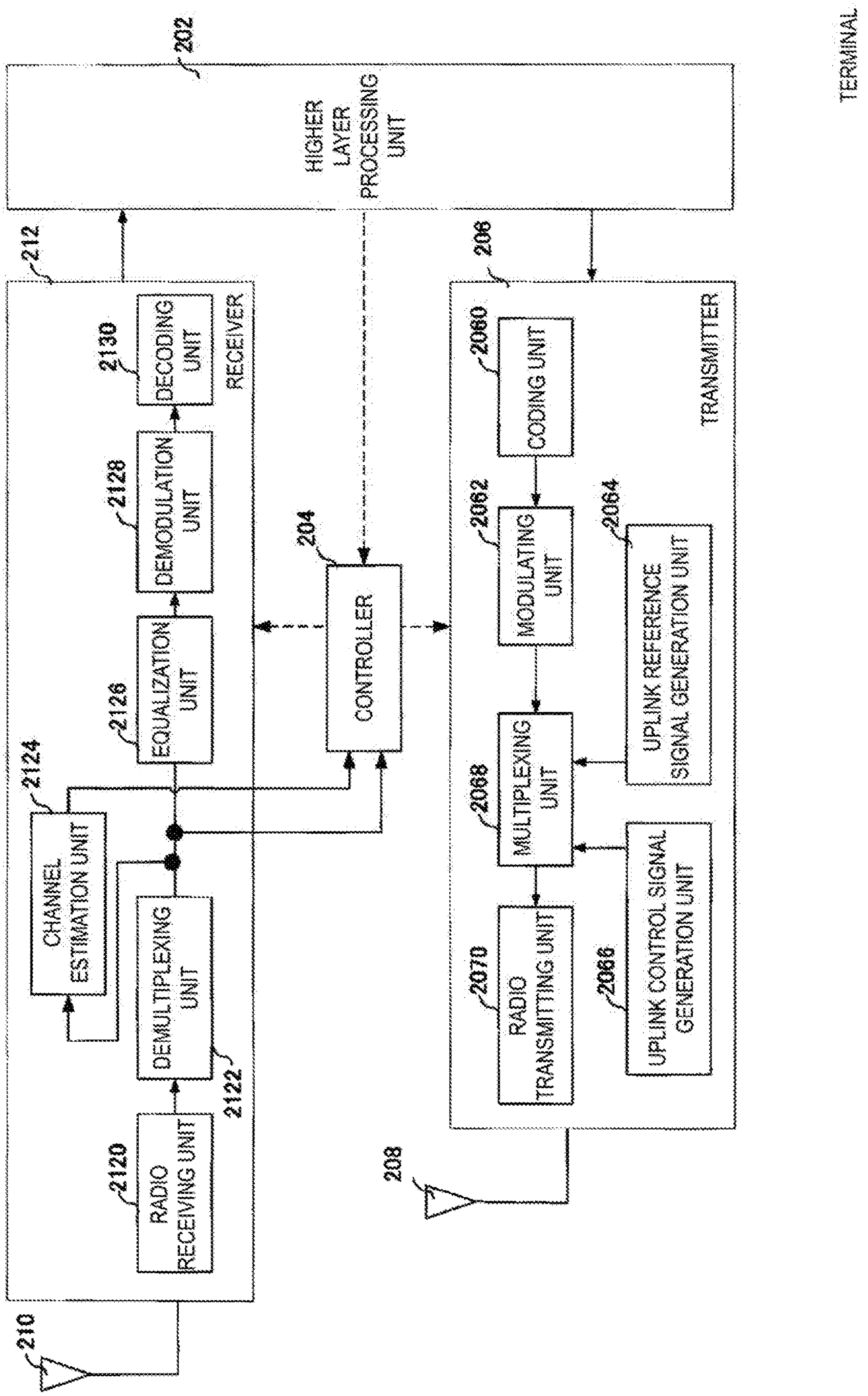
FIG. 12 is a schematic block diagram illustrating a configuration of a terminal apparatus 20 according to the first embodiment.

FIG. 12 is a schematic block diagram illustrating a configuration of the terminal apparatus 20 according to the present embodiment. The terminal apparatus 20 includes a higher layer processing unit (higher layer processing step) 202, a controller (control step) 204, a transmitter (transmitting step) 206, a transmit antenna 208, a receive antenna 210, and a receiver (receiving step) 212.

The higher layer processing unit 202 performs processing on a layer higher than the physics layer, such as a Medium Access Control (MAC) layer, a Packet Data Convergence Protocol (PDCP) layer, a Radio Link Control (RLC) layer, and a Radio Resource Control (RRC) layer. The higher layer processing unit 202 manages various pieces of configuration information of own terminal apparatus. The higher layer processing unit 202 notifies the base station apparatus 10 of information indicating functions of the terminal apparatus supported by the terminal apparatus itself (UE Capability) via the transmitter 206. The higher layer processing unit 202 notifies the UE Capability by RRC signaling. For example, the UE Capability includes information indicating whether the 256QAM mode CQI report configuration/1024QAM mode CQI report configuration is supported.

The higher layer processing unit 202 acquires the measurement result (CSI measurement result) of the downlink channel condition (channel condition) from the receiver 212.

The higher layer processing unit 202 acquires the RRC message transmitted by the base station apparatus 10 from the receiver 212. The RRC message includes the configuration information for the CQI report. The configuration information for the CQI report includes the 256QAM mode CQI report configuration and the 1024QAM mode CQI report configuration. The higher layer processing unit 202 selects a CQI index where the transport block on the PDSCH would be receivable without in excess of the predetermined block error probability (for example, an error rate of 0.1) from the CQI table, based on the "CSI measurement subframe set" and "CQI table selection" parameters included in the configuration information for the CQI report in addition to the CSI measurement result. The higher layer processing unit 202 generates the CQI report including the CQI index (Aperiodic CQI).

The CQI report configuration information includes configuration information on periodicity of the CQI report (Periodic CQI) (such as a report interval of the CQI). The configuration information on periodicity is input to the controller 204 along with the CQI index. The CQI index included in the Periodic CQI is included in the UCI. The higher layer processing unit 202 inputs the "CSI measurement subframe set" and the "CQI table selection" to the controller 204.

Figure 13:
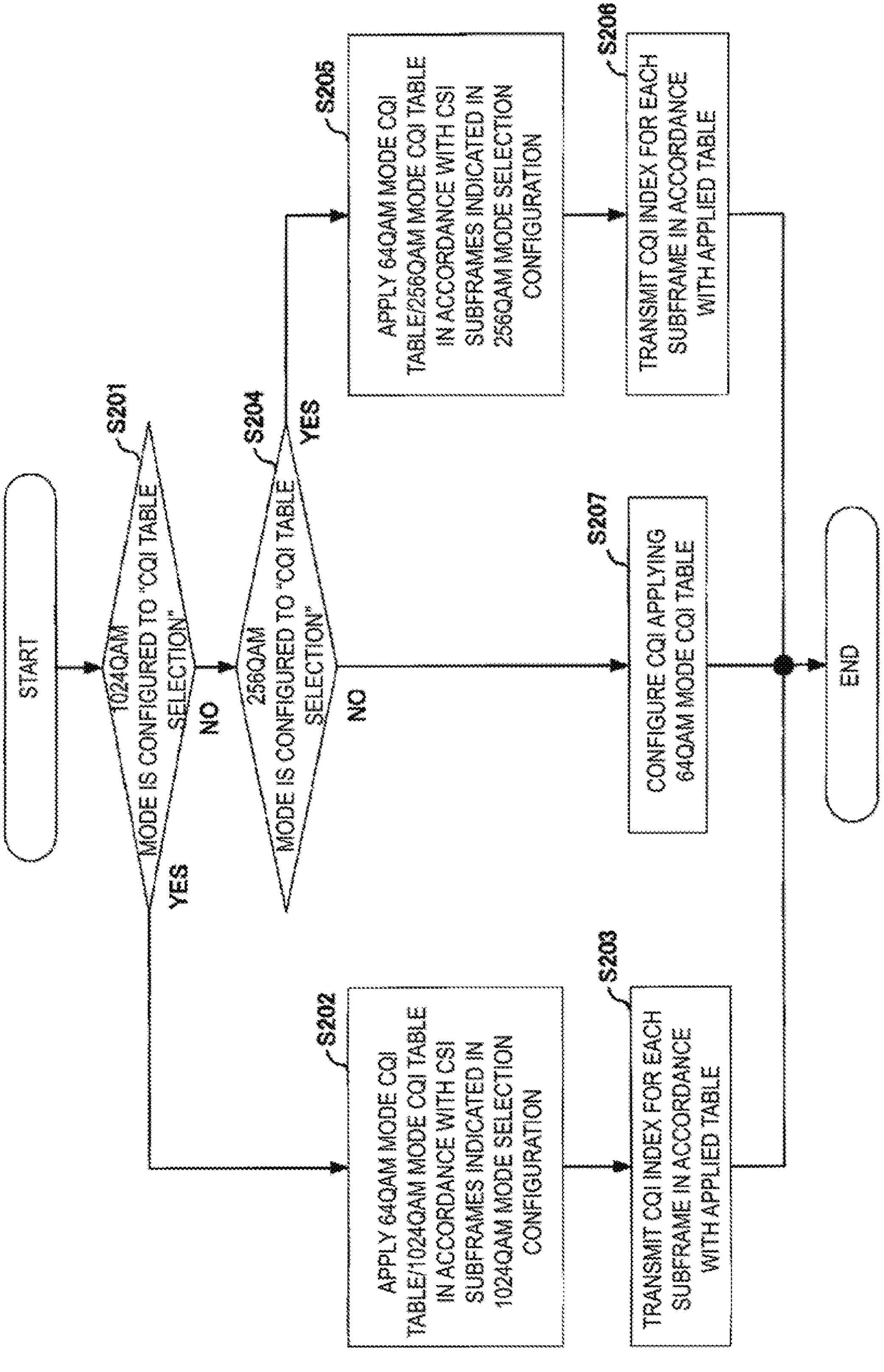
FIG. 13 is a diagram illustrating an example of a configuration flow for a CQI index according to the first embodiment.

FIG. 13 is a diagram illustrating an example of a configuration flow for the CQI index according to the present embodiment. The higher layer processing unit 202 holds the CQI tables in FIG. 2 to FIG. 4 and the MCS tables in FIG. 5 to FIG. 7. In a case that the 1024QAM mode is set in the "CQI table selection" (S201), the higher layer processing unit 202 applies the 1024QAM mode CQI table to the subframes indicated by the "CQI table selection" (S202). In this case, in a case that the "all frames" is configured in the "CQI table selection," the higher layer processing unit 202 calculates the CQI index using the 1024QAM mode CQI table to all subframes. In a case that the "first CSI subframe set" is configured in the "CQI table selection," the higher layer processing unit 202 calculates the CQI index using the 1024QAM mode CQI table to the subframes indicated by the "first CSI subframe set." On the other hand, the CQI index is calculated using the 64QAM mode CQI table to the subframes not indicated by the "first CSI subframe set." The higher layer processing unit 202 calculates the CQI index similarly in a case that the "second CSI subframe set" is configured in the "CQI table selection." The higher layer processing unit 202 transmits the CQI index to the base station apparatus 10 using the PUSCH/PDSCH (S203).

In a case of NO in S201, the higher layer processing unit 202 determines whether the 256QAM mode is set in the "CQI table selection" (S204). In a case that the "CQI table selection" is set, the 256QAM mode CQI table is applied to the subframes indicated by the "CQI table selection" (S205). In this case, in a case that the "all frames" is configured in the "CQI table selection," the higher layer processing unit 202 calculates the CQI index using the 256QAM mode CQI table to all subframes. In a case that the "first CSI subframe set" is configured in the "CQI table selection," the higher layer processing unit 202 calculates the CQI index using the 256QAM mode CQI table to subframes indicated by the "first CSI subframe set." On the other hand, the CQI index is calculated using the 64QAM mode CQI table to subframes not indicated by the "first CSI subframe set." The higher layer processing unit 202 calculates the CQI index similarly in a case that the "second CSI subframe set" is configured in the "CQI table selection." The higher layer processing unit 202 transmits the CQI index to the base station apparatus 10 using the PUSCH/PDSCH (S206). In a case of NO at S204, the higher layer processing unit 202 applies the 64QAM mode CQI table to all subframes (S207).

The higher layer processing unit 202 acquires data after being decoded, such as the DL-SCH and the BCH, from the receiver 212. The higher layer processing unit 202 generates the HARQ-ACK from the error detection result of the DL-SCH. The higher layer processing unit 202 generates the SR. The higher layer processing unit 202 generates the UCI including the HARQ-ACK/SR/CSI (including the CQI report). The higher layer processing unit 202 inputs the UCI and the UL-SCH to the transmitter 206. Note that some functions of the higher layer processing unit 202 may be included in the controller 204.

The controller 204 controls the CQI report (Aperiodic CQI) transmitted with the UCI in accordance with the configuration information on the periodicity. The controller 204 interprets the downlink control information (DCI) received via the receiver 212. The controller 204 controls the transmitter 206 in accordance with the PUSCH scheduling/MCS index/Transmission Power Control (TPC), and the like acquired from the DCI for uplink transmission. The controller 204 controls the receiver 212 in accordance with the PDSCH scheduling/MCS index, and the like acquired from the DCI for downlink transmission.

Figure 14:
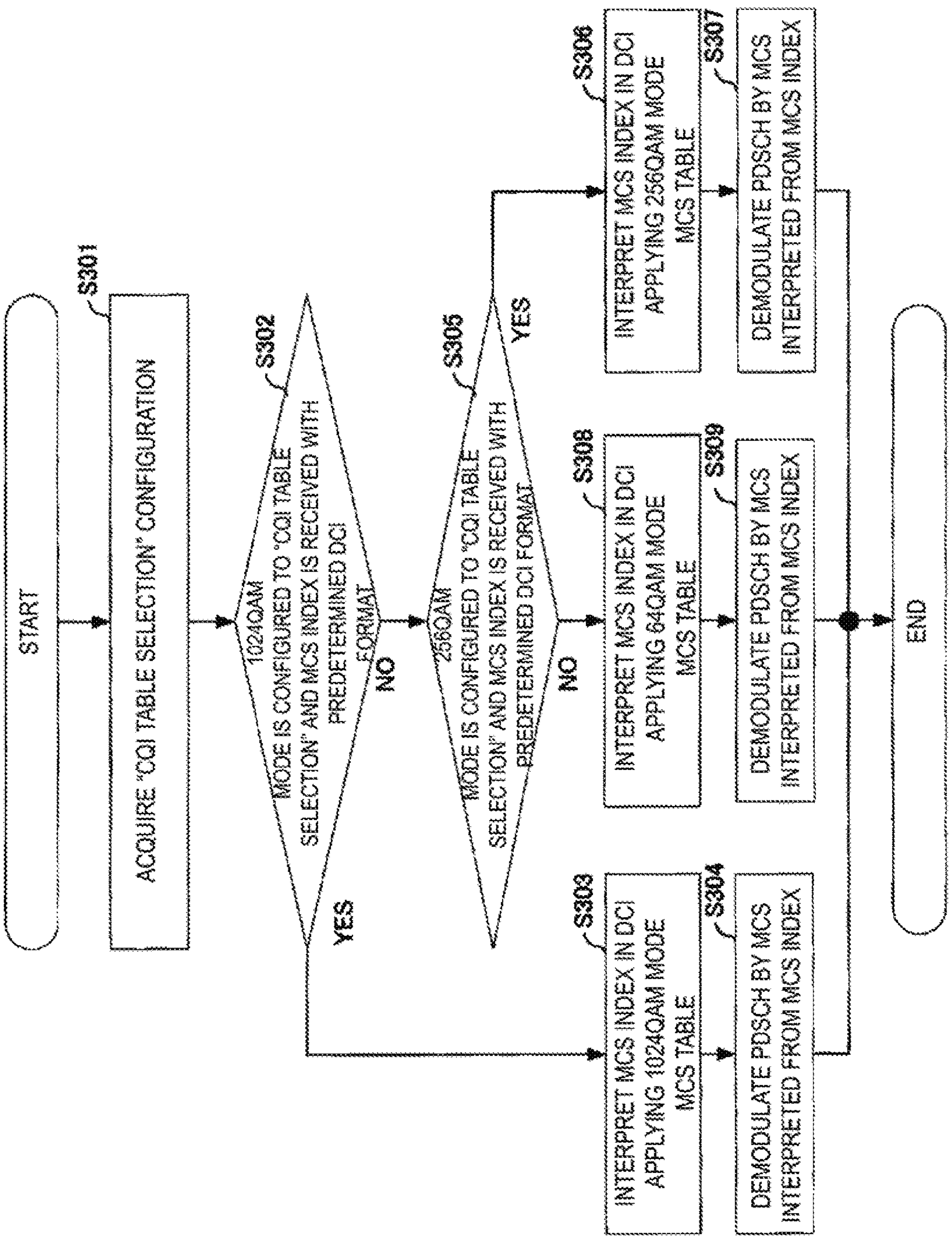
FIG. 14 is a diagram illustrating an example of an interpretation flow for an MCS index according to the first embodiment.

FIG. 14 is a diagram illustrating an example of an interpretation flow for the MCS index according to the present embodiment. The controller 204 holds the CQI tables in FIG. 2 to FIG. 4 and the MCS tables in FIG. 5 to FIG. 7. In a case that the DCI with the CRC scrambled with the RNTI except for the P-RNTI, the RA-RNTI, and the SI-RNTI is used, the controller 204 determines the modulation order used for demodulation of the PDSCH according to the procedure in FIG. 14. In a case that the controller 204 acquires "CQI table selection configuration" (S301), the controller 204 determines whether the "CQI table selection configuration" is the "CQI table selection" of the 1024QAM mode (S302). In a case that the "CQI table selection" is the 1024QAM mode, to allocate the PDSCH with the PDCCH/EPDCCH having the predetermined DCI format (YES of S302), the controller 204 uses the 1024QAM mode CQI table and the MCS index included in the DCI to determine the modulation order used for demodulation of the PDSCH (S303). The controller 204 controls demodulation of the PDSCH according to the 1024QAM mode CQI table and the modulation order calculated from the MCS index (S304).

In a case of NO in Step S302, the higher layer processing unit 202 determines whether the 256QAM mode is set in the "CQI table selection" (S305). In a case that the higher layer processing unit 202 sets the 256QAM mode in the "CQI table selection," to allocate the PDSCH with the PDCCH/EPDCCH having the predetermined DCI format (YES of S305), the controller 204 uses the 256QAM mode CQI table and the MCS index included in the DCI to determine the modulation order used for demodulation of the PDSCH (S306). The controller 204 controls demodulation of the PDSCH according to the 256QAM mode CQI table and the modulation order calculated from the MCS index (S307).

In a case of NO in Step S305 (that is, in a case that the conditions of S302 and S305 are not met), the controller 204 uses the 64QAM mode CQI table and the MCS index included in the DCI to determine the modulation order used for the PDSCH (S308). The controller 204 controls demodulation of the PDSCH according to the 64QAM mode CQI table and the modulation order calculated from the MCS index (S309). Here, the predetermined DCI format in S302 and S305 is a DCI format 1/1B/1D/2/2A/2B/2C/2D with the CRC scrambled with the C-RNTI. These DCI formats are formats with which the PDCCH transmission can be performed using a USS (user-unique search space) in addition to a CSS (cell-common search space).

The transmitter 206 includes a coding unit (coding step) 2060, a modulating unit (modulating step) 2062, an uplink reference signal generation unit (uplink reference signal generating step) 2064, an uplink control signal generation unit (uplink control signal generating step) 2066, a multiplexing unit (multiplexing step) 2068, and a radio transmitting unit (radio transmitting step) 2070.

The coding unit 2060 performs encoding, such as convolutional coding, block coding, and turbo coding, on the uplink data (UL-SCH) input from the higher layer processing unit 202 according to the control by the controller 204.

The modulating unit 2062 modulates the coded bits input from the coding unit 2060 (generates modulation symbols for the PUSCH) by a modulation scheme indicated from the controller 204/modulation scheme predetermined for each channel, such as the BPSK, QPSK, 16QAM, 64QAM 256QAM, and 1024QAM. Note that in a case that the DFT-S-OFDM is used, after modulation, Discrete Fourier Transform (DFT) processing is performed.

The uplink reference signal generation unit 2064 generates a sequence obtained from a predetermined rule (formula), based on a physical cell identifier (physical cell identity, also referred to as a PCI, a cell ID, or the like) for identifying the base station apparatus 10, a bandwidth in which the uplink reference signals are mapped, a cyclic shift, parameter values to generate the DMRS sequence, and the like, in accordance with an indication by the controller 204.

In accordance with the indication from the controller 204, the uplink control signal generation unit 2066 encodes the UCI, performs the BPSK/QPSK modulation, and generates modulation symbols for the PUCCH.

In accordance with the uplink scheduling information from the controller 204, the multiplexing unit 2068 multiplexes the modulation symbols for the PUSCH, the modulation symbols for the PUCCH, and the uplink reference signals for each transmit antenna port (in other words, the respective signals are mapped to the resource elements).

The radio transmitting unit 2070 performs Inverse Fast Fourier Transform (IFFT) on the multiplexed signals to generate the OFDM symbols. The radio transmitting unit 2070 adds CPs to the OFDM symbols to generate baseband digital signals. Furthermore, the radio transmitting unit 2070 converts the baseband digital signal into an analog signal, removes extra frequency components from the analog signal, converts the signal into a carrier frequency by up-conversion, performs power amplification, and transmits it to the base station apparatus 10 via the transmit antenna 208.

The receiver 212 includes a radio receiving unit (radio receiving step) 2120, a demultiplexing unit (demultiplexing step) 2122, a channel estimation unit (channel estimation step) 2144, an equalization unit (equalizing step) 2126, a demodulation unit (demodulating step) 2128, and a decoding unit (decoding step) 2130.

The radio receiving unit 2120 converts the downlink signal received through the receive antenna 210 into a baseband signal by down-conversion, removes unnecessary frequency components from the baseband signal, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 2120 removes a part equivalent to the CP from the digital signal resulting from the conversion, performs the FFT on the signal from which the CP has been removed, and extracts a signal in the frequency domain.

The demultiplexing unit 2122 separates the extracted frequency domain signals into the downlink reference signal, the PDCCH, the PUSCH, and the PBCH. A channel estimation unit 2124 uses the downlink reference signal (such as the CRS and the DMRS) to estimate a frequency response (or delay profile). The frequency response result acquired from the channel estimation for demodulation is input to the equalization unit 1126. The channel estimation unit 2124 measures the uplink channel condition (measures a Reference Signal Received Power (RSRP), a Reference Signal Received Quality (RSRQ), a Received Signal Strength Indicator (RSSI), and a Signal to Interference plus Noise power Ratio (SINR)) using the downlink reference signal (such as the CRS and the CSI-RS). The measurement of the downlink channel condition is used to determine the MCS for the PUSCH and the like. The measurement result of the downlink channel condition is used to determine the CQI index and the like.

The equalization unit 2126 generates an equalization weight based on an MMSE standard, from the frequency response input from the channel estimation unit 2124. The equalization unit 2126 multiplies the input signal (the PUCCH, the PDSCH, the PBCH, the PHICH, and the like) from the demultiplexing unit 2122 by the equalization weight. The demodulation unit 2128 performs demodulation processing based on information on the predetermined modulation order/modulation order indicated by the controller 204.

The decoding unit 2130 performs decoding processing on the output signal from the demodulation unit 2128 based on information on the predetermined coding rate/information on the coding rate indicated by the controller 204. The decoding unit 2130 inputs the data after being decoded (such as the DL-SCH) to the higher layer processing unit 202.

As described above, by interpreting the modulation order used for demodulation of the PDSCH using the three kinds of MCS tables/CSI tables formed of different modulation schemes, the terminal apparatus can flexibly change the range of the MCS selectable for demodulation of the PDSCH according to the channel condition and the application.

Second Embodiment

A communication system of the present embodiment is an example of a case in which information indicating a subframe group on which the CSI measurement is performed using the identical CQI table, is shared between the 256QAM mode and the 1024QAM mode for use. The communication system 1 according to the present embodiment (FIG. 1) includes the base station apparatus 10 (FIG. 9) and the terminal apparatus 20 (FIG. 12). In the communication system 1 according to the present embodiment (the base station apparatus 10 and the terminal apparatus 20), the CQI tables in FIG. 2 to FIG. 4 and the MCS tables in FIG. 5 to FIG. 7 are shared. Differences from/additions to the first embodiment will be mainly described below.

The configuration information of the CQI report according to the present embodiment includes three parameters: "CSI measurement subframe set," "CSI subframe set selection," and "CQI mode selection." The "CSI measurement subframe set" is information indicating the subframe group on which the CSI measurement is performed using the same CQI table, similarly to the "CSI measurement subframe set" according to the first embodiment. For example, in a case that the "CSI measurement subframe set" is configured as (1, 0, 1, 0, 1, 0, 1, 0, 1, 0), the "CSI measurement subframe set" indicates a "first CSI subframe set" including the subframes #1, #3, #5, #7, and #9 corresponding to "0" and a "second CSI subframe set" including the subframes #0, #2, #4, #6, and #8 corresponding to "1."

The "CSI subframe set selection" is configuration information indicating subframes to which the CQI table selected in the "CQI mode selection" is applied. The higher layer processing unit 102 configures "all subframes," the "first CSI subframe set," or the "second CSI subframe set" to the "CSI subframe set selection." The "CQI mode selection" is configuration information indicating which CQI tables in FIG. 2 and FIG. 3 is used. For example, in a case that the CQI report is performed on the "first subframe set" (#0, #2, #4, #6, and #8) configured in the "CSI subframe set selection" using the 256QAM mode CQI table (FIG. 3), the higher layer processing unit 102 in the base station apparatus 10 configures the 256QAM mode to the "CQI mode selection." This indicates that the CQI report is performed on the subframes (#1, #3, #5, #7, and #9) not configured in the "CSI subframe set selection" using the 64QAM mode CQI table (FIG. 2). Similarly, in a case that the CQI report is performed on the subframe set configured in the "CSI subframe set selection" using the 1024QAM mode CQI table (FIG. 4), the higher layer processing unit 102 in the base station apparatus 10 configures the 1024QAM mode to the "CQI mode selection." As described above, sharing the "CSI measurement subframe set" and the "CSI subframe set selection" between the 256QAM mode and 1024QAM mode allows reducing the configuration information.

Configurations of the "CSI measurement subframe set," the "CSI subframe set selection," and the "CQI mode selection" can be independently changed. To change all configurations of the "CSI measurement subframe set," the "CSI subframe set selection," and the "CQI mode selection," the higher layer processing unit 202 transmits the CQI report configuration information including all of the "CSI measurement subframe set," the "CSI subframe set selection," and the "CQI mode selection" to the terminal apparatus 20. In a case that only the CSI subframe set is changed among the current configurations, the higher layer processing unit 202 transmits the CQI report configuration information including only the "CSI subframe set selection" to the terminal apparatus 20. This indicates that the CSI table that has already been configured is applied to a CSI subframe set newly configured in the "CSI subframe set selection."

In a case that only the CQI table is changed among the current configurations, the higher layer processing unit 202 transmits the CQI report configuration information including only the "CQI mode selection" to the terminal apparatus 20. This indicates that the newly configured CQI table is applied to the already configured CSI subframe set. Note that, in a condition where the "CSI subframe set selection" is not configured, in a case that the CQI report configuration information including only the "CQI mode selection" is transmitted, this indicates that the newly configured CQI table is applied to all subframes.

With the "CSI measurement subframe set," the "CSI subframe set selection," and the "CQI mode selection" in the present embodiment, the state transition from the 256QAM mode CQI table to the 1024QAM mode CQI table can performed only with the "CQI mode selection." Furthermore, it can be avoided that the presence of a subframe in which the configuration of the 256QAM mode CQI table and the configuration of the 1024QAM mode CQI table collide.

Figure 15:
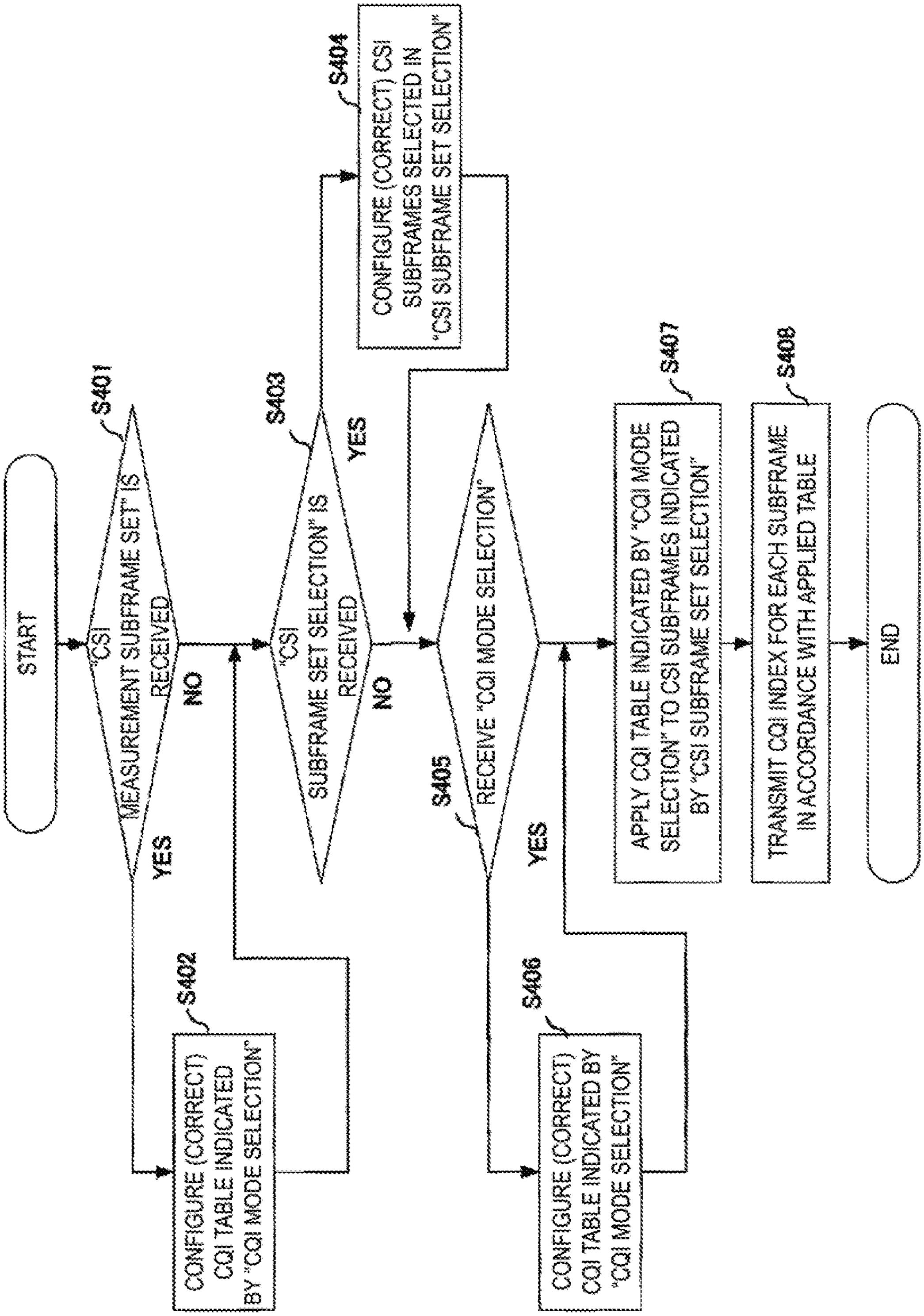
FIG. 15 is a diagram illustrating an example of a configuration flow for a CQI index according to a second embodiment.

FIG. 15 is a diagram illustrating an example of a configuration flow for the CQI index according to the present embodiment. The higher layer processing unit 202 in the terminal apparatus 20 determines whether the CQI report configuration received with the RRC message includes the "CSI measurement subframe set" (S401). In a case that the "CSI measurement subframe set" is included (YES of S401), the higher layer processing unit 202 rewrites a bitmap indicated by the "CSI measurement subframe set" (S402). In the case of NO of S401, the higher layer processing unit 202 holds the bitmap indicated by the already configured "CSI measurement subframe set." Next, the higher layer processing unit 202 determines whether the "CSI subframe set selection" is included in the CQI report configuration received with the RRC message (S403). In a case that the "CSI subframe set selection" is included (YES of S403), the higher layer processing unit 202 rewrites the subframe set so as to be the CSI subframe set indicated by the "CSI subframe set selection" (S404). In the case of NO in S403, the higher layer processing unit 202 holds the already configured CSI subframe set. Furthermore, the higher layer processing unit 202 determines whether the "CQI mode selection" is included in the CQI report configuration received with the RRC message (S405). In a case that the "CQI mode selection" is included (YES of S405), the higher layer processing unit 202 rewrites the CSI table to so as to be the CSI table indicated by the "CQI mode selection" (S406). In the case of NO in S405, the higher layer processing unit 202 holds the already configured CSI subframe set.

The higher layer processing unit 202 applies the stored "CSI subframe set selection" and the "CQI table selection" after performing S401 to S406 (S407). Then, the higher layer processing unit 202 calculates the CQI index in accordance with the configuration of the CQI table for each subframe (S408). The higher layer processing unit 202 transmits the calculation result of the CQI index to the base station apparatus 10 with the CSI report. As described above, the "CSI measurement subframe set," the "CSI subframe set selection," and the "CQI mode selection" can be independently corrected. Thus, since only the parameter that needs to be corrected can be transmitted, the control information can be reduced.

Figure 16:
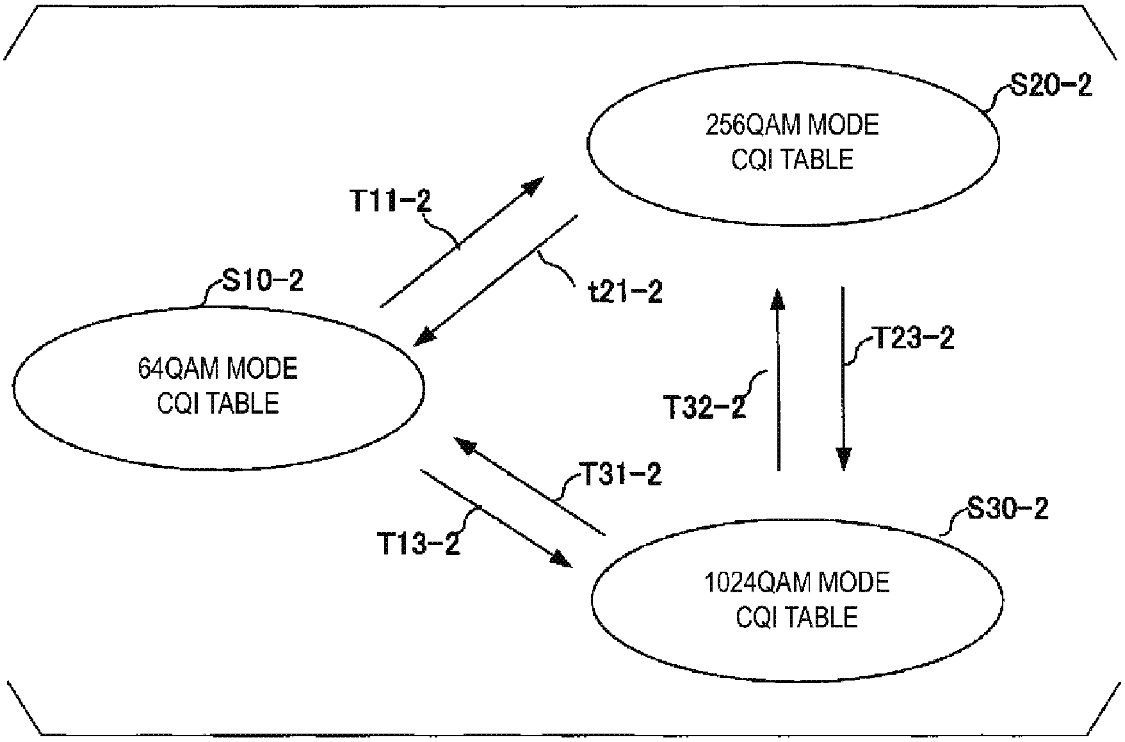
FIG. 16 is a diagram illustrating an example of state transition of a CQI table according to the second embodiment.

FIG. 16 is a diagram illustrating an example of state transition of the CQI table according to the present embodiment. FIG. 16 illustrates a 64QA mode CQI (S10-2) in a state of performing the CQI report using only the 64QAM mode CQI table (or in a state of performing the CQI report applying a reference table). A 256QAM mode CQI (S20-2) indicates a state of performing the CQI report using the 64QAM mode CQI table/256QAM mode CQI table. A 1024QAM Mode CQI (S30-2) indicates a state of performing the CQI report using the 64QAM mode CQI table/1024QAM mode CQI table. The communication system according to the present embodiment allows direct state transition between the 256QAM mode CQI and the 1024QAM mode CQI (T23-2, T32-2), in addition to the state transition between the 64QAM mode CQI and the 256QAM mode CQI (T12-2, T21-2) and the state transition between the 64QAM mode CQI and the 1024QAM mode CQI (T13-2, T31-2).

The state transition T12-2 is performed by the "CQI mode selection" with the "CSI subframe set selection"/256QAM set. The state transition T21-2 is performed by releasing the "CQI table selection." The state transition T13-2 is performed by the "CQI mode selection" with the "CSI subframe set selection"/1024QAM set. The state transition T31-2 is performed by releasing the "CQI table selection." The state transition T23-2 is performed by the "CQI mode selection" to which the 1024QAM is set. The state transition T32-2 is performed by the "CQI mode selection" to which the 256QAM is set. As a result, transmitting the configuration information of only the "CQI mode selection" allows the state transition between the 256QAM mode CQI and the 1024QAM mode CQI, and thus the configuration information can be reduced. Furthermore, the state transition between the 256QAM mode CQI and the 1024QAM mode CQI can be directly performed, making it possible to reduce a step for state transition and shorten processing time.

Figure 17:
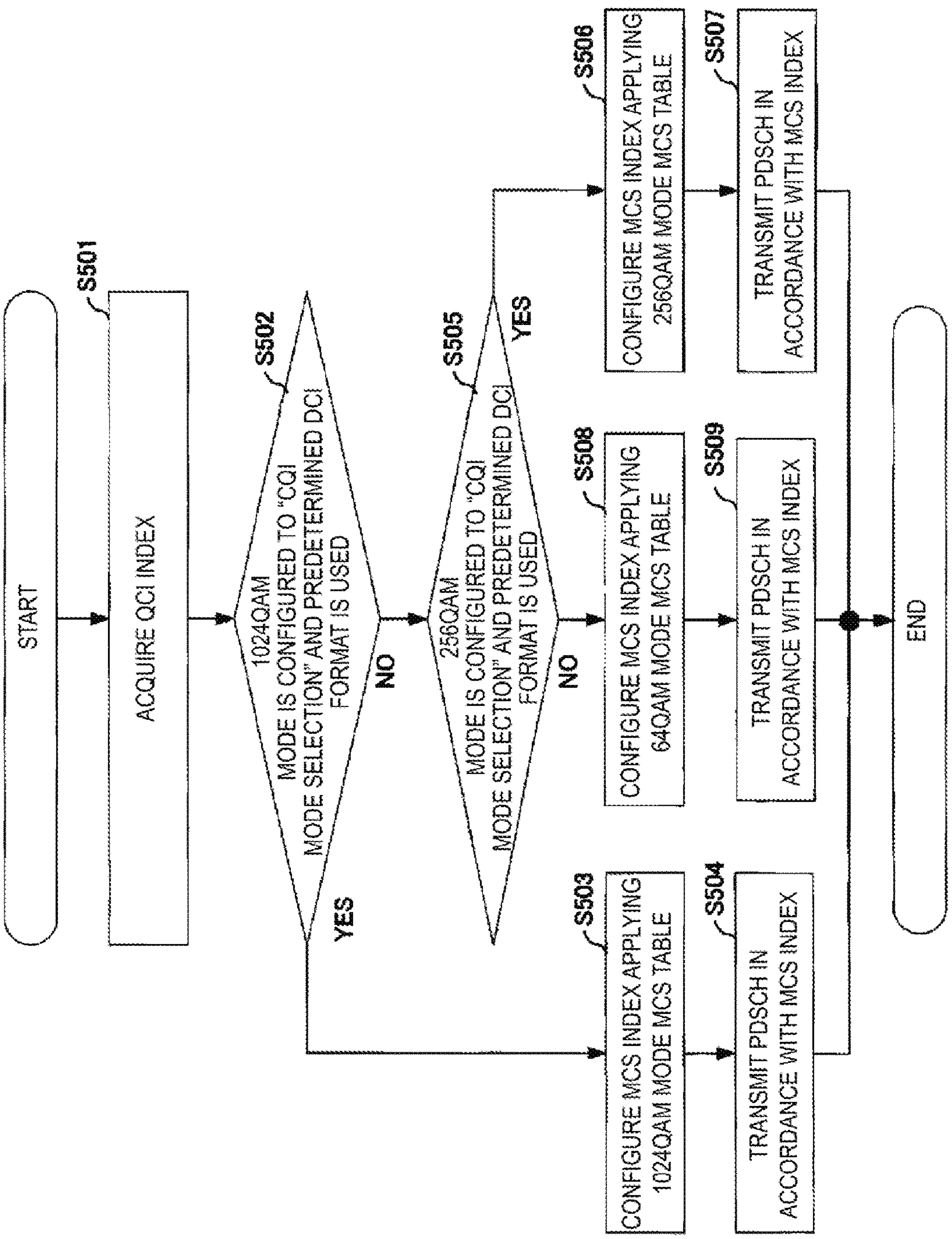
FIG. 17 is a diagram illustrating an example of an interpretation flow for an MCS index according to the second embodiment.

Next, the following describes the configuration of the MCS index according to the present embodiment. The base station apparatus 10 and the terminal apparatus 20 select the MCS index based on the configuration in the "CQI mode selection." FIG. 17 is a diagram illustrating an example of an interpretation flow for the MCS index according to the present embodiment. The base station apparatus 10 and the terminal apparatus 20 hold the CQI tables in FIG. 2 to FIG. 4 and the MCS tables in FIG. 5 to FIG. 7. In a case that the DCI with the CRC scrambled with the RNTI other than the P-RNTI, the RA-RNTI, and the SI-RNTI is used, the controller 104 determines the modulation scheme of the PDSCH by the procedure in FIG. 10. The controller 104 acquires the CQI index included in the CSI report (S501). In addition to the transport block size of the PDSCH and the bandwidth used for PDSCH transmission (the number of resource blocks), the controller 104 determines the modulation order used for the PDSCH in consideration of the content of the CQI index.

In a case that the higher layer processing unit 102 configures the 1024QAM mode CQI table in the "CQI mode selection," to allocate the PDSCH with the PDCCH/EPDCCH having the predetermined DCI format (YES of S502), the controller 104 uses the 1024QAM mode CQI table and the MCS index to determine the modulation order used for the PDSCH. The controller 104 includes the MCS index configured using the 1024QAM mode CQI table in the DCI (S503). The controller 104 further inputs the modulation order indicated by the MCS index to the transmitter 106. The transmitter 106 transmits the PDSCH modulated based on the modulation order (S504).

In a case of NO in Step S502, the higher layer processing unit 102 determines whether the 256QAM mode CQI table selection is configured (S505). In a case that the higher layer processing unit 102 configures the 256QAM mode CQI table in the "CQI mode selection," to allocate the PDSCH with the PDCCH/EPDCCH having the predetermined DCI format (YES of S505), the controller 104 uses the 256QAM mode CQI table and the MCS index to determine the modulation order used for the PDSCH. The controller 104 includes the MCS index configured using the 256QAM mode CQI table in the DCI (S506). The controller 104 further inputs the modulation order indicated by the MCS index to the transmitter 106. The transmitter 106 transmits the PDSCH modulated based on the modulation order (S507).

In a case of NO in Step S505 (that is, in a case that the conditions of S502 and S505 are not met), the controller 104 uses the 64QAM mode CQI table and the MCS index to determine the modulation order used for the PDSCH. The controller 104 includes the MCS index configured using the 64QAM mode CQI table in the DCI (S508). The controller 104 further inputs the modulation order indicated by the MCS index to the transmitter 106. The transmitter 106 transmits the PDSCH modulated based on the modulation order (S509). Here, the predetermined DCI format in S502 and S505 is a DCI format 1/1B/1D/2/2A/2B/2C/2D with the CRC scrambled with the C-RNTI. These DCI formats are formats with which the PDCCH transmission can be performed using a USS (user-unique search space) in addition to a CSS (cell-common search space). As described above, by the use of the three kinds of MCS tables/CSI tables of different modulation schemes selectable for the PDSCH, the range of the MCS selectable for the PDSCH can be flexibly changed according to a channel condition and an application.

Note that the controller 204 in the terminal apparatus 20 interprets the MCS index included in the DCI in the PDCCH following the flow in FIG. 17 (S502, S503, S505, S506, and S508) and determines a modulation scheme for demodulating the PDSCH. In a case that the 1024QAM mode CQI table is configured to the "CQI mode selection," to allocate the PDSCH with the PDCCH/EPDCCH having the predetermined DCI format (YES of S502), the controller 204 uses the 1024QAM mode CQI table and the MCS index to determine the modulation order used for the PDSCH (S503). The receiver 212 demodulates the PDSCH based on the modulation order interpreted by the MCS index.

In a case of NO in Step S502, the higher layer processing unit 202 determines whether the 256QAM mode CQI table selection is configured (S505). In a case that the higher layer processing unit 202 configures the 256QAM mode CQI table in the "CQI mode selection," to allocate the PDSCH with the PDCCH/EPDCCH having the predetermined DCI format (YES of S505), the controller 204 uses the 256QAM mode CQI table and the MCS index to determine the modulation order used for the PDSCH (S506). The receiver 212 demodulates the PDSCH based on the modulation order interpreted by the MCS index. In a case of NO in Step S505 (that is, in a case that the conditions of S502 and S505 are not met), the controller 204 uses the 64QAM mode CQI table and the MCS index to determine the modulation order used for the PDSCH (S508). The receiver 212 demodulates the PDSCH based on the modulation order interpreted by the MCS index.

Third Embodiment

A communication system of the present embodiment is an example of stepwise changing the used CQI table selection of the 64QAM mode, 256QAM mode, and 1024QAM mode. The communication system 1 according to the present embodiment (FIG. 1) includes the base station apparatus 10 (FIG. 9) and the terminal apparatus 20 (FIG. 12). In the communication system 1 according to the present embodiment (the base station apparatus 10 and the terminal apparatus 20), the CQI tables in FIG. 2 to FIG. 4 and the MCS tables in FIG. 5 to FIG. 7 are shared. Differences from/additions to the first embodiment and the second embodiment will be mainly described below.

Figure 18:
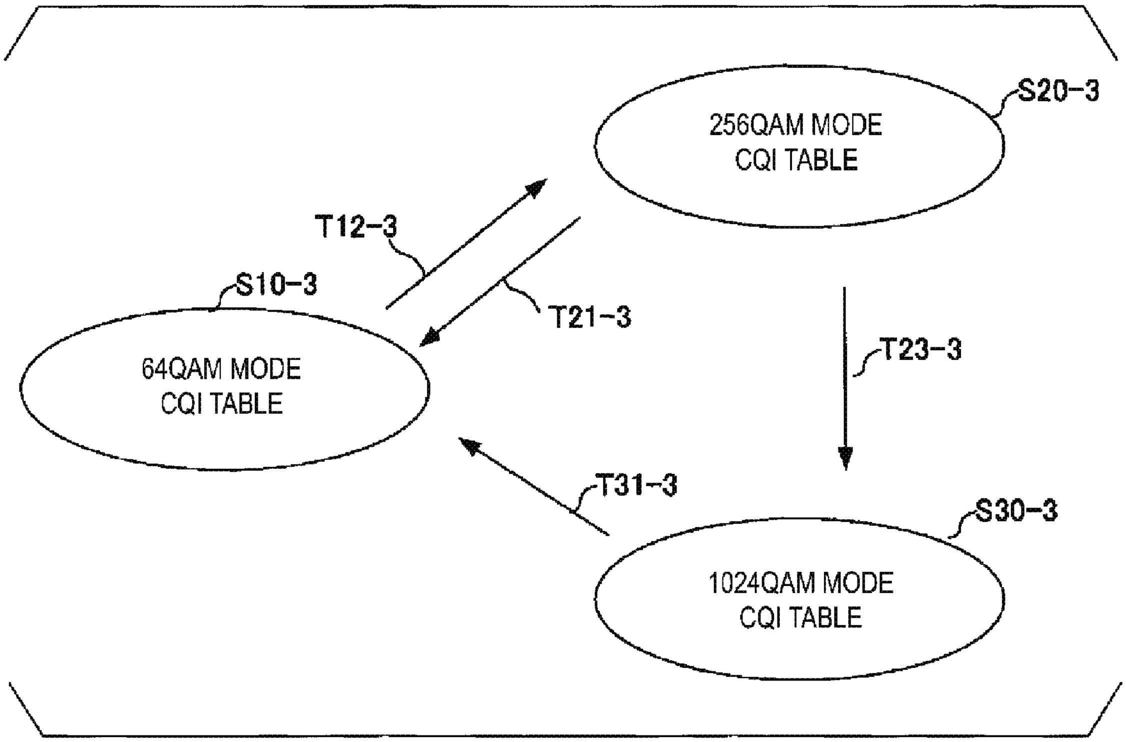
FIG. 18 is a diagram illustrating an example of state transition of a CQI table according to a third embodiment.

FIG. 18 is a diagram illustrating an example of state transition of the CQI table according to the present embodiment. In FIG. 18, a 64QA mode CQI (S10-3) indicates a state of performing the CQI report using only the 64QAM mode CQI table (or a state of performing the CQI report applying the reference table). A 256QAM mode CQI (S20-3) indicates a state of performing the CQI report using the 64QAM mode CQI table/256QAM mode CQI table. A 1024QAM mode CQI (S30-3) indicates a state of performing the CQI report using the 64QAM mode CQI table/1024QAM mode CQI table. The communication system according to the present embodiment allows only state transition from the 256QAM mode CQI to the 1024QAM mode CQI (T23-2) in addition to state transition between the 64QAM mode CQI and the 256QAM Mode CQI (T12-2, T21-2) (direct state transition from the 64QAM mode CQI to the 1024QAM mode CQI is prohibited). For downgrade (for fallback) from the 1024QAM mode CQI, only the state transition from the 1024QAM mode to the 64QAM mode may be allowed.

The flow of FIG. 15 is applicable to the configuration flow for the CQI index according to the present embodiment. The state transition T12-3 is performed by the "CQI mode selection" with the "CSI subframe set selection"/256QAM set. The state transition T21-3 is performed by releasing the "CQI table selection." The state transition T31-3 is performed by releasing the "CQI table selection." The state transition T23-3 is performed by the "CQI mode selection" to which the 1024QAM is set. Note that the communication system 1 can apply the configuration flow for the MCS index of FIG. 17.

The base station apparatus 10 can grasp that the MCS index in the modulation order up to "6" (64QAM) can be configured (selected) in the state of the 64QA mode CQI (S10-3). In this case, to transmit the PDSCH in the modulation order up to "6" (64QAM), the base station apparatus 10 cannot grasp whether the channel is in a communicable state up to the modulation order of the 1024QAM. Thus, in the channel state where only the modulation order up to the 256QAM is communicable, selecting the 1024QAM mode CQI substantially narrows down the range of the selectable MCS index. In the present embodiment, the modes, the 64QAM mode, the 256QAM mode, and the 1024QAM mode are stepwise changed, thereby ensuring avoiding a risk of substantially narrowing down the range of the selectable MCS index. Furthermore, by transmitting only the configuration information of the "CQI mode selection," the state transition between the 256QAM mode CQI and the 1024QAM mode CQI can be performed, so the configuration information can be reduced.

Fourth Embodiment

A communication system of the present embodiment is an example of selecting any two CQI tables from the three CQI tables (the 64QAM mode, the 256QAM mode, and the 1024QAM mode) and configuring the MCS for the PDSCH. The communication system 1 according to the present embodiment (FIG. 1) includes the base station apparatus 10 (FIG. 9) and the terminal apparatus 20 (FIG. 12). In the communication system 1 according to the present embodiment (the base station apparatus 10 and the terminal apparatus 20), the CQI tables in FIG. 2 to FIG. 4 and the MCS tables in FIG. 5 to FIG. 7 are shared. Differences from/additions to the first embodiment, the second embodiment, and the third embodiment will be mainly described below.

The configuration information of the CQI report according to the present embodiment includes three parameters: "CSI measurement subframe set," "CSI subframe set selection," and "CQI table combination." Similarly to the "CSI measurement subframe set" according to the first embodiment, the "CSI measurement subframe set" is information indicating a subframe group on which the CSI measurement is performed using the same CQI table. For example, in a case that the "CSI measurement subframe set" is configured as (1, 0, 1, 0, 1, 0, 1, 0, 1, 0), the "CSI measurement subframe set" indicates a "first CSI subframe set" including the subframes #1, #3, #5, #7, and #9 corresponding to "0" and a "second CSI subframe set" including the subframes #0, #2, #4, #6, and #8 corresponding to "1."

The "CSI subframe set selection" is configuration information indicating subframes to which the CQI table selected in the "CQI table combination" is applied. The higher layer processing unit 102 configures "all subframes," the "first CSI subframe set," or the "second CSI subframe set" to the "CSI subframe set selection." The "CQI mode selection" is configuration information indicating which combination of the CQI tables from FIG. 1 to FIG. 3 is used. For example, the higher layer processing unit 102 in the base station apparatus 10 configures the "first subframe set" (#0, #2, #4, #6, and #8) in the "CSI subframe set selection," and further configures a combination [256QAM mode CQI table, 1024QAM mode CQI table] to the "CQI table combination." In this case, the higher layer processing unit 202 in the terminal apparatus 20 interprets that the CQI report is performed applying the 1024QAM mode CQI table stored on the right side (FIG. 4) to the subframes configured in the "first subframe set." On the other hand, the higher layer processing unit 202 in the terminal apparatus 20 interprets that the CQI report is performed applying the 1024QAM mode CQI table stored on the right side (FIG. 4) to the subframes (#1, #3, #5, #7, and #9) not configured in the "CSI subframe set selection."

The higher layer processing unit 102 in the base station apparatus 10 configures the "all subframes" in the "CSI subframe set selection," and further configures a combination [256QAM mode CQI table, 1024QAM mode CQI table] to the "CQI table combination." In this case, the higher layer processing unit 202 in the terminal apparatus 20 interprets that the CQI report is performed applying the 1024QAM mode CQI table stored on the right side (FIG. 4) to the "all subframes." Note that the communication system 1 of the present embodiment allows storing the CQI tables in the same mode in the "CQI table combination." In the "CQI table combination," in the case of storing the CQI tables in the same mode, the application of the CQI tables to all subframes may be indicated.

As described above, any selected combination of two CQI tables is applied to the subframes indicated by the "CSI subframe set selection." Thus, three or more CQI tables can be switched by a bitmap indicated by the "CSI subframe set selection."

Figure 19:
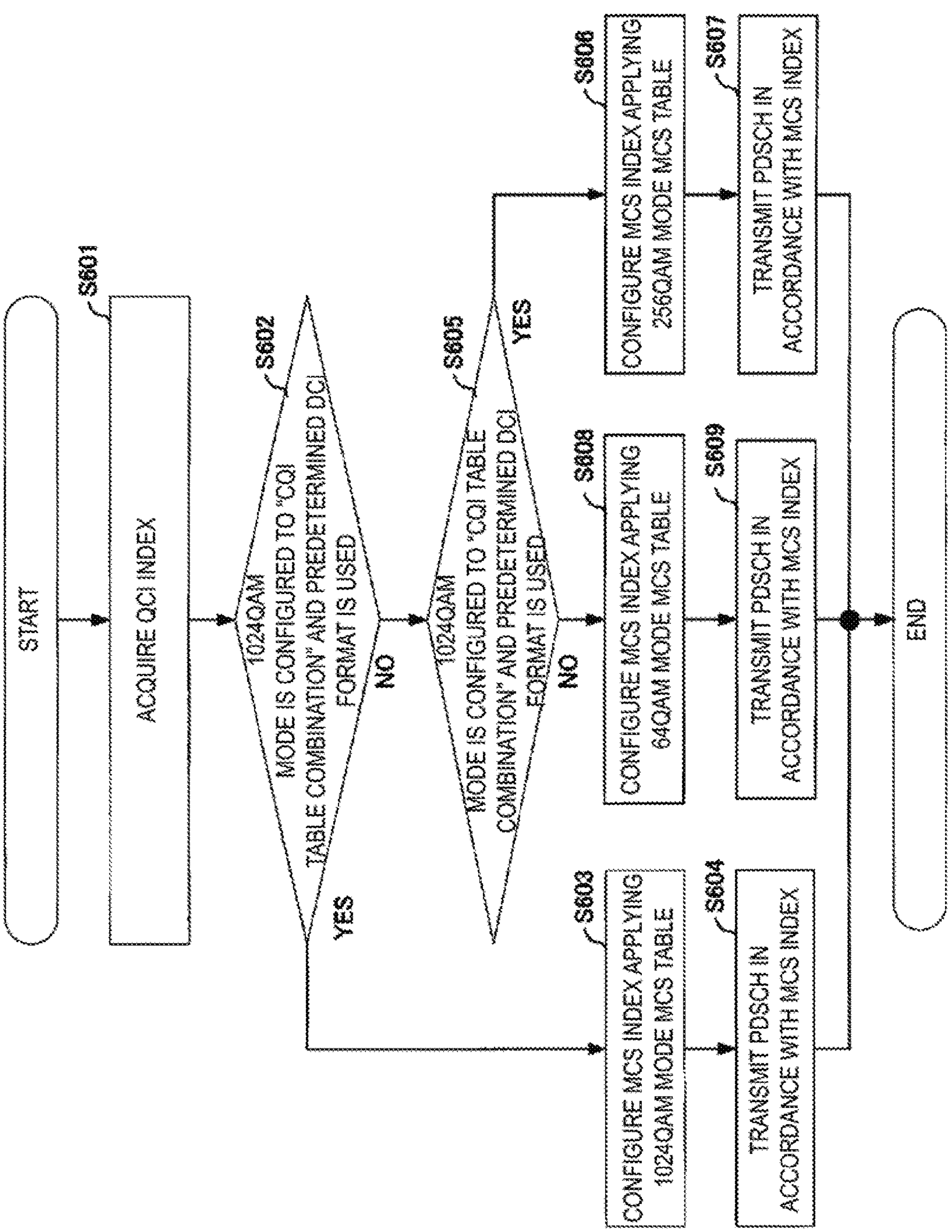
FIG. 19 is a diagram illustrating an example of an interpretation flow for an MCS index according to a fourth embodiment.

Next, the following describes a configuration of the MCS index according to the present embodiment. The base station apparatus 10 and the terminal apparatus 20 select the MCS index based on the configuration of the "CQI table combination." FIG. 19 is a diagram illustrating an example of an interpretation flow for the MCS index according to the present embodiment. The base station apparatus 10 and the terminal apparatus 20 hold the CQI tables in FIG. 2 to FIG. 4 and the MCS tables in FIG. 5 to FIG. 7. In a case that the DCI with the CRC scrambled with the RNTI except for the P-RNTI, the RA-RNTI, and the SI-RNTI is used, the controller 104 determines the modulation scheme of the PDSCH by the procedure in FIG. 19. The controller 104 acquires the CQI index included in the CSI report (S601). In addition to the transport block size of the PDSCH and the bandwidth used for PDSCH transmission (the number of resource blocks), the controller 104 determines the modulation order used for the PDSCH in consideration of the content of the CQI index.

In a case that the CQI table configured to the "CQI table combination" by the higher layer processing unit 102 includes the 1024QAM mode CQI table (in a case that the maximum modulation order selected is determined with the 1024QAM mode CQI table), to allocate the PDSCH with the PDCCH/EPDCCH having the predetermined DCI format (YES of S602), the controller 104 uses the 1024QAM mode CQI table and the MCS index to determine the modulation order used for the PDSCH. The controller 104 includes the MCS index configured using the 1024QAM mode CQI table in the DCI (S603). The controller 104 further inputs the modulation order indicated by the MCS index to the transmitter 106. The transmitter 106 transmits the PDSCH modulated based on the modulation order (S604).

In a case of NO in Step S602, whether the CQI tables configured to the "CQI table combination" include the 256QAM mode CQI table is determined (S605). In a case that the CQI table configured to the "CQI table combination" by the higher layer processing unit 102 includes the 256QAM mode CQI table (in a case that the maximum modulation order selected is determined with the 256QAM mode CQI table), to allocate the PDSCH with the PDCCH/EPDCCH having the predetermined DCI format (YES of 605), the controller 104 uses the 256QAM mode CQI table and the MCS index to determine the modulation order used for the PDSCH. The controller 104 includes the MCS index configured using the 256QAM mode CQI table in the DCI (S606). The controller 104 further inputs the modulation order indicated by the MCS index to the transmitter 106. The transmitter 106 transmits the PDSCH modulated based on the modulation order (S607).

In a case of NO in Step S605 (that is, in a case that the conditions of S602 and S605 are not met), the controller 104 uses the 64QAM mode CQI table and the MCS index to determine the modulation order used for the PDSCH. The controller 104 includes the MCS index configured using the 64QAM mode CQI table in the DCI (S608). The controller 104 further inputs the modulation order indicated by the MCS index to the transmitter 106. The transmitter 106 transmits the PDSCH modulated based on the modulation order (S609). Here, the predetermined DCI format in S602 and S605 is a DCI format 1/1B/1D/2/2A/2B/2C/2D with the CRC scrambled with the C-RNTI. These DCI formats are formats with which the PDCCH transmission can be performed using a USS (user-unique search space) in addition to a CSS (cell-common search space). As described above, by the use of the three kinds of MCS tables/CSI tables of different modulation schemes selectable for the PDSCH, the range of the MCS selectable for the PDSCH can be flexibly changed according to a channel condition and an application.

Note that the controller 204 in the terminal apparatus 20 interprets the MCS index included in the DCI in the PDCCH following the flow in FIG. 19 (S602, S603, S605, S606, and S608) and determines a modulation scheme for demodulating the PDSCH. In a case that the CQI table configured to the "CQI table combination" includes the 1024QAM mode CQI table, to allocate the PDSCH with the PDCCH/EPDCCH having the predetermined DCI format (YES of S602), the controller 204 uses the 1024QAM mode CQI table and the MCS index to determine the modulation order used for the PDSCH (S603). The receiver 212 demodulates the PDSCH based on the modulation order interpreted by the MCS index.

In a case of NO in Step S602, whether the CQI tables configured to the "CQI table combination" include the 256QAM mode CQI table is determined (S605). In a case that the CQI table configured to the "CQI table combination" includes the 256QAM mode CQI table, to allocate the PDSCH with the PDCCH/EPDCCH having the predetermined DCI format (YES of 605), the controller 204 uses the 256QAM mode CQI table and the MCS index to determine the modulation order used for the PDSCH (S606). The receiver 212 demodulates the PDSCH based on the modulation order interpreted by the MCS index.

In a case of NO in Step S605 (that is, in a case that the conditions of S602 and S605 are not met), the controller 204 uses the 64QAM mode CQI table and the MCS index to determine the modulation order used for the PDSCH (S606). The receiver 212 demodulates the PDSCH based on the modulation order interpreted by the MCS index. Here, the predetermined DCI format in S602 and S605 is a DCI format 1/1B/1D/2/2A/2B/2C/2D with the CRC scrambled with the C-RNTI. These DCI formats are formats with which the PDCCH transmission can be performed using a USS (user-unique search space) in addition to a CSS (cell-common search space). As described above, by the use of the three kinds of MCS tables/CSI tables of different modulation schemes selectable for the PDSCH, the range of the MCS selectable for the PDSCH can be flexibly changed according to a channel condition and an application.

Note that in the first embodiment to the fourth embodiment, the "CQI table selection," the "CQI mode selection," and the "CQI table combination" are collectively referred to as "information on CQI table selection." The "CSI measurement subframe set" and the "CSI subframe set selection" are collectively referred to as "information on CSI subframe set." The "information on CQI table selection" and the "information on the CSI subframe set" are referred to as "information for selecting the CQI table."

Note that an aspect of the present invention can employ the following aspects.

(1) An aspect of the present invention is a base station apparatus that communicates with a terminal apparatus, the base station apparatus including a transmitter configured to transmit CSI report configuration information, a receiver configured to receive a CSI report, and a controller configured to interpret the CSI report based on the CSI report configuration information. The transmitter is further configured to, in a case that a CQI table applied to interpret the CSI report is changed from a first CQI table to a second CQI table, transmit information on a CQI table selection indicating applicability of the second CQI table, and a CSI subframe set indicating subframes for which a CQI table configured with the information on the CQI table selection is used, the transmitter is further configured to, in a case that the CQI table applied to interpret the CSI report is changed from the second CQI table to a third CQI table, transmit the information on the CQI table selection indicating applicability of the third CQI table. The first CQI table includes at least a first modulation scheme, the first modulation scheme includes QPSK, 16QAM, and 64QAM, the second CQI table includes at least a second modulation scheme, the second modulation scheme includes QPSK, 16QAM, 64QAM, and 256QAM, the third CQI table includes at least a third modulation scheme, and information on the third modulation scheme includes QPSK, 16QAM, 64QAM, 256QAM, and 1024QAM.

(2) In addition, according to an aspect of the present invention, the controller may be further configured to apply the CQI table used to interpret the CSI report to determine a modulation scheme to be used to modulate of a PDSCH.

(3) In addition, according to an aspect of the present invention, in a case that the transmitter transmits the CSI report configuration information including only the information on the CQI table selection as information for selecting the CQI table, the controller may be configured to interpret the CSI report by using the information on the CQI table selection and the CSI subframe set indicated by CSI report configuration information transmitted before the CSI report configuration information.

(4) In addition, according to an aspect of the present invention, in a case that the transmitter transmits the CSI report configuration information including only the information on the CQI table selection as information for selecting the CQI table, the controller may be configured to apply the information on the CQI table selection to all the subframes and interpret the CSI report.

(5) In addition, according to an aspect of the present invention, the transmitter may further be configured to, in a case that only the subframes used for the CQI table applied to interpret the CSI report are changed, transmit the CSI subframe set, and the controller may further be configured to interpret the CSI report by using the CSI subframe set and the information on the CQI table selection indicated by CSI report configuration information transmitted before the CSI subframe set.

(6) In addition, according to an aspect of the present invention, the information on the CQI table selection may indicate two CQI tables selected from the first CQI table, the second CQI table, and the third CQI table. The controller may further be configured to: apply one CQI table among the two CQI tables selected to the subframes indicated by the CSI subframe set to interpret the CSI report; and apply another CQI table among the two CQI tables selected to the subframes not indicated by the CSI subframe set to interpret the CSI report.

(7) In addition, according to an aspect of the present invention, the controller may be configured to apply the CQI table used to interpret the CSI report to the subframes indicated by the CSI subframe set to determine a modulation scheme to be used to modulate a PDSCH.

(8) An aspect of the present invention is a communication method for a base station apparatus that communicates with a terminal apparatus, the communication method including: transmitting CSI report configuration information; receiving a CSI report; and performing a control to interpret the CSI report based on the CSI report configuration information. In a case that a CQI table applied to interpret the CSI report is changed from a first CQI table to a second CQI table, information on a CQI table selection indicating applicability of the second CQI table and a CSI subframe set indicating subframes for which a CQI table selected with the information on the CQI table selection is used are transmitted, and in a case that the CQI table applied to interpret the CSI report is changed from the second CQI table to a third CQI table, the information on the CQI table selection indicating applicability of the third CQI table is transmitted. The first CQI table includes at least a first modulation scheme, the first modulation scheme includes QPSK, 16QAM, and 64QAM, the second CQI table includes at least a second modulation scheme, the second modulation scheme includes QPSK, 16QAM, 64QAM, and 256QAM, the third CQI table includes at least a third modulation scheme, and information on the third modulation scheme includes QPSK, 16QAM, 64QAM, 256QAM, and 1024QAM.

(9) An aspect of the present invention is a terminal apparatus that communicates with a base station apparatus. The terminal apparatus includes a receiver configured to receive CSI report configuration information, a transmitter configured to transmit a CSI report, and a controller configured to create the CSI report based on the CSI report configuration information. The controller is further configured to, in a case that the CSI report configuration information includes information on a CQI table selection indicating a CQI table applied to create the CSI report and a CSI subframe set indicating subframes to which the CQI table is applied, create the CSI report by using the information on the CQI table selection and the CSI subframe set, and the controller is further configured to, in a case that the CSI report configuration information includes only the information on the CQI table selection as information for selecting the CQI table, create the CSI report by using the information on the CQI table selection and a CSI subframe set indicated by CSI report configuration information received before the CSI report configuration information. The information on the CQI table selection indicates which of a first CQI table, a second CQI table, and a third CQI table is to be applied to the CSI report configuration information to create the CSI report. The first CQI table includes at least a first modulation scheme, the first modulation scheme includes QPSK, 16QAM, and 64QAM, the second CQI table includes at least a second modulation scheme, the second modulation scheme includes QPSK, 16QAM, 64QAM, and 256QAM, the third CQI table includes at least a third modulation scheme, and information on the third modulation scheme includes QPSK, 16QAM, 64QAM, 256QAM, and 1024QAM.

(10) An aspect of the present invention is a communication method for a terminal apparatus that communicates with a base station apparatus, the communication method including: receiving CSI report configuration information; transmitting a CSI report; and performing a control to create the CSI report based on the CSI report configuration information. In a case that the CSI report configuration information includes information on a CQI table selection indicating a CQI table applied to create the CSI report and a CSI subframe set indicating subframes to which the CQI table is applied, the CSI report is created by using the information on the CQI table selection and the CSI subframe, and in a case that the CSI report configuration information includes only the information on the CQI table selection as information for selecting the CQI table, the CSI report is created by using the information on the CQI table selection and the CSI subframe set indicated by CSI report configuration information received before the CSI report configuration information. The information on the CQI table selection indicates which of a first CQI table, a second CQI table, and a third CQI table is to be applied to the CSI report configuration information to create the CSI report. The first CQI table includes at least a first modulation scheme, the first modulation scheme includes QPSK, 16QAM, and 64QAM, the second CQI table includes at least a second modulation scheme, the second modulation scheme includes QPSK, 16QAM, 64QAM, and 256QAM, the third CQI table includes at least a third modulation scheme, and information on the third modulation scheme includes QPSK, 16QAM, 64QAM, 256QAM, and 1024QAM.

As described above, according to the present embodiment, the base station apparatus and the terminal apparatus can flexibly select the modulation scheme in accordance with the channel condition using multiple CQI tables and MCS tables.

A program running on an apparatus according to an aspect of the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In that case, a program for realizing the functions of the embodiments may be recorded on a computer readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use an integrated circuit based on the technology.

Note that the present invention of the present patent application is not limited to the above-described embodiments. In the embodiment, apparatuses have been described as an example, but the present invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of an aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be suitably used in a base station apparatus, a terminal apparatus, and a communication method. An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

10 Base station apparatus
20 Terminal apparatus
**10*a* Range within which base station apparatus 10** is connectable to terminal apparatus
102 Higher layer processing unit
104 Controller
106 Transmitter

108 Transmit antenna
110 Receive antenna
112 Receiver
1060 Coding unit
1062 Modulating unit
1064 Downlink control signal generation unit
1066 Downlink reference signal generation unit
1068 Multiplexing unit
1070 Radio transmitting unit
1120 Radio receiving unit
1122 Channel estimation unit
1124 Demultiplexing unit
1126 Equalization unit
1128 Demodulation unit
1130 Decoding unit
202 Higher layer processing unit
204 Controller
206 Transmitter
208 Transmit antenna
210 Receive antenna
212 Receiver
2060 Coding unit
2062 Modulating unit
2064 Uplink reference signal generation unit
2066 Uplink control signal generation unit
2068 Multiplexing unit
2070 Radio transmitting unit
2120 Radio receiving unit
2122 Demultiplexing unit
2124 Channel estimation unit
2126 Equalization unit
2128 Demodulation unit
2130 Decoding unit

The invention claimed is:

1. A base station apparatus configured to communicate with a terminal apparatus, the base station apparatus comprising transmission circuitry configured to transmit, to the terminal apparatus, a radio resource control (RRC) message in which a first information element, a second information element, and a third information element are specified and reception circuitry, wherein for a channel state information (CSI) reporting, the first information element and the second information element indicate applicability of a first channel quality indicator (CQI) table and a second CQI table, respectively, the third information element indicates whether each of a plurality of subframes in a radio frame belongs to a CSI subframe set 1 or a CSI subframe set 2, in a case that the first information element is configured and indicates all of the plurality of subframes, the reception circuitry is configured to receive a CQI according to the first CQI table for all of the plurality of subframes, in a case that the second information element is configured and indicates all of the plurality of subframes, the reception circuitry is configured to receive a CQI according to the second CQI table for all of the plurality of subframes, in a case that the first information element is configured and is set to a first value indicating one of the CSI subframe set 1 and the CSI subframe set 2, the reception circuitry is configured to receive a CQI according to the first CQI table for the one of the CSI subframe set 1 and the CSI subframe set 2 configured by the first information element and receive a CQI according to a third CQI table for the other of the CSI subframe set 1 and the CSI subframe set 2, and in a case that the second information element is configured and is set to a second value indicating one of the CSI subframe set 1 and the CSI subframe set 2, the reception circuitry is configured to receive a CQI according to the second CQI table for the one of the CSI subframe set 1 and the CSI subframe set 2 configured by the second information element and receive a CQI according to the third CQI table for the other of the CSI subframe set 1 and the CSI subframe set 2, and the first information element and the second information element are not configured simultaneously.

2. A terminal apparatus configured to communicate with a base station apparatus, the terminal apparatus comprising reception circuitry configured to receive, from the base station apparatus, a radio resource control (RRC) message in which a first information element, a second information element, and a third information element are specified, and transmission circuitry, wherein for a channel state information (CSI) reporting, the first information element and the second information element indicate applicability of a first channel quality indicator (CQI) table and a second CQI table, respectively, the third information element indicates whether each of a plurality of subframes in a radio frame belongs to a CSI subframe set 1 or a CSI subframe set 2, in a case that the first information element is configured and indicates all of the plurality of subframes, the transmission circuitry is configured to report a CQI according to the first CQI table for all of the plurality of subframes, in a case that the second information element is configured and indicates all of the plurality of subframes, the transmission circuitry is configured to report a CQI according to the second CQI table for all of the plurality of subframes, in a case that the first information element is configured and is set to a first value indicating one of the CSI subframe set 1 and the CSI subframe set 2, the transmission circuitry is configured to report a CQI according to the first CQI table for the one of the CSI subframe set 1 and the CSI subframe set 2 configured by the first information element and report a CQI according to a third CQI table for the other of the CSI subframe set 1 and the CSI subframe set 2, and in a case that the second information element is configured and is set to a second value indicating one of the CSI subframe set 1 and the CSI subframe set 2, the transmission circuitry is configured to report a CQI according to the second CQI table for the one of the CSI subframe set 1 and the CSI subframe set 2 configured by the second information element and report a CQI according to the third CQI table for the other of the CSI subframe set 1 and the CSI subframe set 2, and the first information element and the second information element are not configured simultaneously.

3. A communication method for a base station apparatus configured to communicate with a terminal apparatus, the communication method comprising transmitting, to the terminal apparatus, a radio resource control (RRC) message in which a first information element, a second information element, and a third information element are specified wherein for a channel state information (CSI) reporting, the first information element and the second information element indicate applicability of a first channel quality indicator (CQI) table and a second CQI table, respectively, the third information element indicates whether each of a plurality of subframes in a radio frame belongs to a CSI subframe set 1 or a CSI subframe set 2, in a case that the first information element is configured and indicates all of the plurality of subframes, a CQI is received according to the first CQI table for all of the plurality of subframes, in a case that the second information element is configured and indicates all of the plurality of subframes, a CQI is received according to the second CQI table for all of the plurality of subframes, in a case that the first information element is configured and is set to a first value indicating one of the CSI subframe set 1 and the CSI subframe set 2, a CQI is received according to the first CQI table for the one of the CSI subframe set 1 and the CSI subframe set 2 configured by the first information element and a CQI is received according to a third CQI table for the other of the CSI subframe set 1 and the CSI subframe set 2, and in a case that the second information element is configured and is set to a second value indicating one of the CSI subframe set 1 and the CSI subframe set 2, a CQI is received according to the second CQI table for the one of the CSI subframe set 1 and the CSI subframe set 2 configured by the second information element and a CQI is received according to the third CQI table for the other of the CSI subframe set 1 and the CSI subframe set 2, and the first information element and the second information element are not configured simultaneously.

4. A communication method for a terminal apparatus configured to communicate with a base station apparatus, the communication method comprising receiving, from the base station apparatus, a radio resource control (RRC) message in which a first information element, a second information element, and a third information element are specified, wherein for a channel state information (CSI) reporting, the first information element and the second information element indicate applicability of a first channel quality indicator (CQI) table and a second CQI table, respectively, the third information element indicates whether each of a plurality of subframes in a radio frame belongs to a CSI subframe set 1 or a CSI subframe set 2, in a case that the first information element is configured and indicates all of the plurality of subframes, a CQI is reported according to the first CQI table for all of the plurality of subframes, in a case that the second information element is configured and indicates all of the plurality of subframes, a CQI is reported according to the second CQI table for all of the plurality of subframes, in a case that the first information element is configured and is set to a first value indicating one of the CSI subframe set 1 and the CSI subframe set 2, a CQI is reported according to the first CQI table for the one of the CSI subframe set 1 and the CSI subframe set 2 configured by the first information element and a CQI is reported according to a third CQI table for the other of the CSI subframe set 1 and the CSI subframe set 2, and in a case that the second information element is configured and is set to a second value indicating one of the CSI subframe set 1 and the CSI subframe set 2, a CQI is reported according to the second CQI table for the one of the CSI subframe set 1 and the CSI subframe set 2 configured by the second information element and a CQI is reported according to the third CQI table for the other of the CSI subframe set 1 and the CSI subframe set 2, and the first information element and the second information element are not configured simultaneously.

* * * * *